US011025914B1

(12) United States Patent
Yuen et al.

(10) Patent No.: US 11,025,914 B1
(45) Date of Patent: Jun. 1, 2021

(54) METHOD BASED ON GLOBAL RATE-DISTORTION OPTIMIZATION FOR RATE CONTROL IN VIDEO CODING

(71) Applicant: TFI Digital Media Limited, Hong Kong (HK)

(72) Inventors: Yiu Fai Yuen, Hong Kong (HK); Mingliang Zhou, Hong Kong (HK); Xuekai Wei, Hong Kong (HK); Shiqi Wang, Hong Kong (HK); Sam Tak Wu Kwong, Hong Kong (HK); Chi Keung Fong, Hong Kong (HK); Hon Wah Wong, Hong Kong (HK)

(73) Assignee: TFI Digital Media Limited, Hong Kong (HK)

( * ) Notice: Subject to any disclaimer, the term of this patent is extended or adjusted under 35 U.S.C. 154(b) by 0 days.

(21) Appl. No.: 16/819,164

(22) Filed: Mar. 15, 2020

(51) Int. Cl.
*H04N 19/147* (2014.01)
*H04N 19/19* (2014.01)
*H04N 19/149* (2014.01)
*H04N 19/172* (2014.01)
*H04N 19/119* (2014.01)
*H04N 19/186* (2014.01)
*H04N 19/169* (2014.01)
*H04N 19/105* (2014.01)

(52) U.S. Cl.
CPC ......... *H04N 19/147* (2014.11); *H04N 19/105* (2014.11); *H04N 19/119* (2014.11); *H04N 19/149* (2014.11); *H04N 19/172* (2014.11); *H04N 19/186* (2014.11); *H04N 19/1883* (2014.11); *H04N 19/19* (2014.11)

(58) Field of Classification Search
CPC ............... H04N 19/147; H04N 19/149; H04N 19/1883; H04N 19/186; H04N 19/105; H04N 19/119; H04N 19/19; H04N 19/172
USPC ...................................................... 375/240.02
See application file for complete search history.

(56) References Cited

U.S. PATENT DOCUMENTS

| 2020/0045312 | A1* | 2/2020 | Poirier | H04N 19/192 |
| 2020/0154115 | A1* | 5/2020 | Ramasubramonian | H04N 19/186 |

(Continued)

OTHER PUBLICATIONS

J. Zhang, X. Yi, N. Ling and W. Shang, "Context Adaptive Lagrange Multiplier (CALM) for Rate-Distortion Optimal Motion Estimation in Video Coding," in IEEE Transactions on Circuits and Systems for Video Technology, vol. 20, No. 6, pp. 820-828, Jun. 2010, doi: 10.1109/TCSVT.2010.2045915. (Year: 2010).*

(Continued)

*Primary Examiner* — Marnie A Matt
(74) *Attorney, Agent, or Firm* — Idea Intellectual Limited; Margaret A. Burke; Sam T. Yip

(57) ABSTRACT

A method for video coding with global rate-distortion optimization-based rate control (RC) is provided. By using this video coding method, an RC scheme for High dynamic range (HDR) in High Efficiency Video Coding (HEVC) is provided. Briefly, considering the characteristics of HDR image content, a rate-distortion (R-D) model based on HDR-Visual Difference Predictor (VDP)-2 for performance optimization is provided. In the optimization process, the $\lambda$ is directly utilized rather than the bit rate to obtain the globally optimal solution. Finally, the model parameter estimation method is used to reduce errors. The video coding method of the present invention is verified that bit rate reduction on average can be achieved.

20 Claims, 28 Drawing Sheets

(56) References Cited

U.S. PATENT DOCUMENTS

2020/0236356 A1* 7/2020 Bordes ................ H04N 19/176
2020/0275104 A1* 8/2020 Zhao .................... H04N 19/174
2020/0288144 A1* 9/2020 Leleannec ............ H04N 19/147

OTHER PUBLICATIONS

J. Si, S. Ma, S. Wang and W. Gao, "Laplace distribution based CTU level rate control for HEVC," 2013 Visual Communications and Image Processing (VCIP), Kuching, 2013, pp. 1-6, doi: 10.1109/VCIP.2013.6706333. (Year: 2013).*

I. Zupancic, M. Naccari, M. Mrak and E. Izquierdo, "Studying rate control methods for UHDTV delivery using HEVC," 2016 International Symposium ELMAR, Zadar, 2016, pp. 47-50, doi: 10.1109/ELMAR.2016.7731752. (Year: 2016).*

M. Wang, K. N. Ngan and H. Li, "Low-Delay Rate Control for Consistent Quality Using Distortion-Based Lagrange Multiplier," in IEEE Transactions on Image Processing, vol. 25, No. 7, pp. 2943-2955, Jul. 2016, doi: 10.1109/TIP.2016.2552646. (Year: 2016).*

I. Marzuki, J. Lee and D. Sim, "Optimal CTU-Level Rate Control Model for HEVC Based on Deep Convolutional Features," in IEEE Access, vol. 8, pp. 165670-165682, 2020, doi: 10.1109/ACCESS.2020.3022408. (Year: 2020).*

K. Rouis, M. Larabi and J. Belhadj Tahar, "Perceptually Adaptive Lagrangian Multiplier for HEVC Guided Rate-Distortion Optimization," in IEEE Access, vol. 6, pp. 33589-33603, 2018, doi: 10.1109/ACCESS.2018.2843384. (Year: 2018).*

\* cited by examiner

| Sequence | PCC | NRMSE |
|---|---|---|
| BalloonFestival | 0.95150 | 0.08640 |
| FireEater2Clip4000r1 | 0.96330 | 0.06120 |
| Market3 | 0.95990 | 0.08510 |
| Market3Clip4000r2 | 0.94770 | 0.08990 |
| ShowGirl2TeaserClip4000 | 0.94380 | 0.09030 |
| PeopleInShoppingCenter | 0.95530 | 0.08570 |
| DayStreet | 0.96110 | 0.06220 |
| FlyingBirds | 0.97990 | 0.04350 |
| Tibul | 0.93040 | 0.09660 |
| AutoWelding | 0.95130 | 0.08650 |
| BikeSparklers | 0.94410 | 0.09020 |
| Cosmos_TreeTrunk | 0.97800 | 0.04330 |
| SunRise | 0.93010 | 0.09670 |
| SunsetBeach | 0.94790 | 0.08970 |
| Average | 0.95316 | 0.07909 |

FIG. 4

| Sequence | PCC | NRMSE |
|---|---|---|
| BalloonFestival | 0.9457 | 0.0898 |
| FireEater2Clip4000r1 | 0.9597 | 0.0851 |
| Market3 | 0.9778 | 0.0434 |
| Market3Clip4000r2 | 0.9436 | 0.0904 |
| ShowGirl2TeaserClip4000 | 0.9532 | 0.0791 |
| PeopleInShoppingCenter | 0.9510 | 0.0860 |
| DayStreet | 0.9613 | 0.0621 |
| FlyingBirds | 0.9559 | 0.0852 |
| Tibul | 0.9305 | 0.0966 |
| AutoWelding | 0.9444 | 0.0901 |
| BikeSparklers | 0.9777 | 0.0439 |
| Cosmos_TreeTrunk | 0.9472 | 0.0899 |
| SunRise | 0.9513 | 0.0866 |
| SunsetBeach | 0.9613 | 0.0620 |
| Average | 0.9543 | 0.0779 |

FIG. 6

| Sequence | HDR $k_{min}$ | HDR $k_{max}$ | SDR $k_{min}$ | SDR $k_{max}$ | Mixed $k_{min}$ | Mixed $k_{max}$ | HDR $c_{min}$ | HDR $c_{max}$ | SDR $c_{min}$ | SDR $c_{max}$ | Mixed $c_{min}$ | Mixed $c_{max}$ | Accuracy |
|---|---|---|---|---|---|---|---|---|---|---|---|---|---|
| BalloonFestival | 32.61 | 33.15 | 32.17 | 32.63 | 32.37 | 32.76 | -0.04003 | -0.03785 | -0.03378 | -0.03015 | -0.03815 | -0.03423 | 0.92030 |
| FireEater3Clip4000s1 | 34.47 | 34.11 | 33.45 | 33.99 | 33.83 | 34.28 | -0.04637 | -0.04268 | -0.04245 | -0.03876 | -0.04322 | -0.04112 | 0.93040 |
| Market3 | 32.55 | 32.83 | 32.21 | 32.57 | 32.42 | 32.76 | -0.04332 | -0.03943 | -0.03761 | -0.03531 | -0.04011 | -0.03750 | 0.96550 |
| Market3Clip4000s2 | 34.18 | 34.63 | 33.66 | 34.13 | 33.89 | 34.22 | -0.03411 | -0.03261 | -0.02933 | -0.02664 | -0.03271 | -0.02829 | 0.90770 |
| ShowGirl2TeaserClip4000 | 37.80 | 37.99 | 37.37 | 37.66 | 37.52 | 37.93 | -0.03092 | -0.02801 | -0.02633 | -0.02411 | -0.02829 | -0.02554 | 0.92660 |
| PeopleInShoppingCenter | 35.99 | 35.72 | 35.01 | 35.55 | 35.41 | 35.83 | -0.03799 | -0.03581 | -0.03174 | -0.02812 | -0.03612 | -0.03223 | 0.95330 |
| DayStreet | 35.39 | 35.59 | 35.10 | 35.29 | 35.21 | 35.50 | -0.04097 | -0.03862 | -0.03465 | -0.03102 | -0.03866 | -0.03366 | 0.89910 |
| FlyingBirds | 31.46 | 31.72 | 31.11 | 31.33 | 31.29 | 31.65 | -0.03771 | -0.03402 | -0.03377 | -0.03011 | -0.03455 | -0.03246 | 0.92330 |
| Tibul | 36.40 | 36.71 | 35.80 | 36.10 | 36.01 | 36.51 | -0.03501 | -0.03111 | -0.02933 | -0.02701 | -0.03182 | -0.02919 | 0.92760 |
| AutoWelding | 36.19 | 36.38 | 35.86 | 36.08 | 35.98 | 36.31 | -0.03563 | -0.03321 | -0.02993 | -0.02678 | -0.03351 | -0.02998 | 0.94400 |
| BikeSparklers | 34.43 | 34.67 | 34.14 | 34.37 | 34.28 | 34.59 | -0.03868 | -0.03649 | -0.03243 | -0.02880 | -0.03680 | -0.03288 | 0.93770 |
| Cosmos_TreeTrunk | 33.17 | 33.26 | 32.62 | 33.03 | 32.89 | 33.27 | -0.03717 | -0.03486 | -0.03208 | -0.02955 | -0.03518 | -0.03136 | 0.91350 |
| SunRise | 36.96 | 37.02 | 36.39 | 36.74 | 36.60 | 37.02 | -0.03621 | -0.03389 | -0.03037 | -0.02712 | -0.03416 | -0.03053 | 0.91410 |
| SunsetBeach | 32.21 | 32.35 | 31.70 | 32.05 | 31.93 | 32.35 | -0.03536 | -0.03261 | -0.02977 | -0.02684 | -0.03398 | -0.02978 | 0.93880 |
| Average | 34.56 | 34.72 | 34.04 | 34.39 | 34.26 | 34.64 | -0.03783 | -0.03509 | -0.03240 | -0.02931 | -0.03552 | -0.03205 | 0.92871 |

FIG. 9

Algorithm 1 Proposed RC method
Input: HDR video.
Output: Encoded bit stream.
1: GOP-level and frame-level RC: initialize the encoding parameters, bit allocation, buffer status, etc.
2: for $i = 1$ to $N$ do
3:    if the current CTU is intra-encoded then
4:       Perform intra-CTU-level RC and then exit the loop.
5:    else
6:       Use the model parameters for the CTU in the co-located position in the previous frame as the model parameters for the current CTU.
7:       Determine the region type to which the current CTU belongs.
8:       if $c_i$ is larger than $c_{region}$ then
9:          Clip $c_i$ as follows: $max(c_i, c_{region} \times c^{-2.0})$, where $c_{region}$ is the average value of $c$ for region of the corresponding type in this frame, which is calculated by averaging the values for all CTUs of this region in the frame.
10:       else
11:          Clip $c_i$ as follows: $min(c_i, c_{region} \times e)$.
12:       end if
13:       if $k_i$ is larger than $k_{region}$ then
14:          Clip $k_i$ as follows: $max(k_i, k_{region} \times e^{-2.0})$, where $k_{region}$ is the average value of $k$ for region of the corresponding type in this frame, which is calculated by averaging the values for all CTUs of this region in the frame.
15:       else
16:          Clip $k_i$ as follows: $min(k_i, k_{region} \times e)$.
17:       end if
18:       Compute $\lambda_i^*$ using equation (18).
19:    end if
20:    Perform the following CTU-level computations: $QP_i = \lfloor a \times \ln(\lambda_i^*) + b + 0.5 \rfloor$, where $a$ and $b$ are constants.
21:    Encode the $i$-th CTU.
22:    Compute $D_i^{real}$.
23:    Update the CTU-level model parameters $c$ and $k$ using equations (20)-(21).
24:    if $i > N + 1$ then
25:       Exit the loop.
26:    end if
27: end for
28: Update the region-level model parameters.

FIG. 10C

| Sequence | Frame Rate (frames per second) | Number of Frames |
|---|---|---|
| BalloonFestival | 24 | 240 |
| FireEater2Clip4000r1 | 25 | 200 |
| Market3 | 50 | 400 |
| Market3Clip4000r2 | 50 | 400 |
| ShowGirl2TeaserClip4000 | 24 | 338 |
| PeopleInShoppingCenter | 60 | 600 |
| DayStreet | 60 | 600 |
| FlyingBirds | 24 | 600 |
| Tibul2 | 30 | 240 |
| AutoWelding | 24 | 426 |
| BikeSparklers | 24 | 479 |
| Cosmos_TreeTrunk | 24 | 240 |
| SunRise | 25 | 200 |
| SunsetBeach | 60 | 300 |

FIG. 11

| Sequence | HM16.19 vs. Proposed | | HM16.19 vs. Bai et al. [1] | | HM16.19 vs. Perez et al. [2] | |
|---|---|---|---|---|---|---|
| | BD-BR (%) | $\Delta T$ (Encoding) | BD-BR (%) | $\Delta T$ (Encoding) | BD-BR (%) | $\Delta T$ (Encoding) |
| BalloonFestival | -2.2 | 2.20% | -1.1 | 0.10% | -1.3 | 3.70% |
| FireEater2Clip4000r1 | -3.5 | 3.10% | -0.8 | 4.40% | -1.0 | 0.80% |
| Market3 | -2.8 | 3.30% | -1.0 | 0.10% | -1.4 | 2.20% |
| Market3Clip4000r2 | -6.0 | 2.30% | -1.6 | 0.10% | -2.5 | 1.50% |
| ShowGirl2TeaserClip4000 | -6.0 | 1.80% | -1.5 | 0.30% | -2.3 | 5.00% |
| PeopleInShoppingCenter | -4.5 | 2.20% | -1.0 | 3.70% | -1.4 | 0.70% |
| DayStreet | -4.5 | 2.40% | -1.1 | 3.70% | -1.7 | 0.20% |
| FlyingBirds | -5.9 | 3.10% | -1.5 | 1.00% | -2.6 | 4.40% |
| Tibul | -5.5 | 5.10% | -1.2 | 6.50% | -2.3 | 3.90% |
| AutoWelding | -3.3 | 3.40% | -0.7 | 0.20% | -1.9 | 2.80% |
| BikeSparklers | -5.4 | 4.50% | -1.1 | 0.70% | -2.6 | 3.70% |
| Cosmos_TreeTrunk | -3.8 | 2.20% | -1.3 | 1.80% | -1.6 | 1.90% |
| SunRise | -6.6 | 3.30% | -1.5 | 1.90% | -2.8 | 2.60% |
| SunsetBeach | -4.4 | 1.90% | -0.9 | 1.30% | -2.2 | 1.70% |
| Average | -4.6 | 2.91% | -1.2 | 1.84% | -2.0 | 2.51% |

FIG. 12

| Sequence | HM16.19 vs. Proposed BD-BR (%) | HM16.19 vs. Bai et al. [1] BD-BR (%) | HM16.19 vs. Perez et al. [2] BD-BR (%) |
|---|---|---|---|
| BalloonFestival | -3.3 | -1.1 | -1.4 |
| FireEater2Clip4000r1 | -4.5 | -0.7 | -1.1 |
| Market3 | -3.8 | -0.9 | -1.3 |
| Market3Clip4000r2 | -7.0 | -1.6 | -2.4 |
| ShowGirl2TeaserClip4000 | -7.0 | -1.6 | -2.3 |
| PeopleInShoppingCenter | -4.9 | -0.5 | -0.7 |
| DayStreet | -5.0 | -0.7 | -1.1 |
| FlyingBirds | -6.8 | -1.4 | -2.5 |
| Tibul | -5.6 | -0.4 | -1.3 |
| AutoWelding | -4.1 | -0.8 | -2.0 |
| BikeSparklers | -6.3 | -1.0 | -2.7 |
| Cosmos_TreeTrunk | -4.9 | -1.2 | -1.8 |
| SunRise | -7.4 | -1.3 | -2.9 |
| SunsetBeach | -5.3 | -0.9 | -2.5 |
| Average | -5.4 | -1.0 | -1.9 |

FIG. 13

| Sequence | HM16.19 vs. Proposed BD-BR (%) | HM16.19 vs. Bai et al. [1] BD-BR (%) | HM16.19 vs. Perez et al. [2] BD-BR (%) |
|---|---|---|---|
| BalloonFestival | -2.8 | -0.6 | -0.8 |
| FireEater2Clip4000r1 | -1.7 | -0.4 | -3.6 |
| Market3 | -8.9 | -2.2 | -3.2 |
| Market3Clip4000r2 | -8.4 | -1.9 | -1.1 |
| ShowGirl2TeaserClip4000 | -2.2 | -0.4 | -1.4 |
| PeopleInShoppingCenter | -5.1 | -0.8 | -1.4 |
| DayStreet | -5.1 | -0.8 | -1.8 |
| FlyingBirds | -5.4 | -0.9 | -1.9 |
| Tibul | -5.4 | -1.0 | -1.8 |
| AutoWelding | -3.7 | -0.7 | -2.1 |
| BikeSparklers | -5.7 | -0.9 | -2.7 |
| Cosmos_TreeTrunk | -4.4 | -1.3 | -1.8 |
| SunRise | -6.9 | -1.2 | -3.0 |
| SunsetBeach | -4.9 | -1.0 | -2.7 |
| Average | -5.0 | -1.1 | -2.1 |

FIG. 14

| Sequence | HM16.19 vs. Proposed | | HM16.19 vs. Bai et al. [1] | | HM16.19 vs. Perez et al. [2] | |
|---|---|---|---|---|---|---|
| | BD-BR (%) | ΔT (Encoding) | BD-BR (%) | ΔT (Encoding) | BD-BR (%) | ΔT (Encoding) |
| BalloonFestival | -2.5 | 3.30% | -0.3 | 3.10% | -1.4 | -1.70% |
| FireEater2Clip4000r1 | -3.7 | 4.10% | 0.1 | -1.10% | -1.0 | 2.90% |
| Market3 | -3.2 | 4.50% | -0.3 | 3.60% | -1.6 | 1.80% |
| Market3Clip4000r2 | -6.2 | 2.70% | -0.8 | 2.30% | -1.9 | 0.90% |
| ShowGirl2TeaserClip4000 | -6.3 | 2.20% | -1.6 | 1.60% | -2.2 | -3.40% |
| PeopleInShoppingCenter | -4.9 | 3.10% | -1.3 | -1.40% | -1.7 | 1.90% |
| DayStreet | -4.8 | 3.30% | -0.6 | -1.20% | -1.7 | 2.60% |
| FlyingBirds | -6.0 | 4.40% | -1.3 | 2.30% | -2.5 | -1.50% |
| Tibul | -5.7 | 6.80% | -0.9 | -1.50% | -2.3 | 1.40% |
| AutoWelding | -3.5 | 4.30% | -0.6 | 1.20% | -1.8 | 2.30% |
| BikeSparklers | -5.4 | 4.70% | -1.0 | 1.70% | -2.7 | 3.60% |
| Cosmos_TreeTrunk | -3.9 | 2.90% | -1.2 | 2.00% | -1.7 | 2.00% |
| SunRise | -6.8 | 4.10% | -1.3 | 2.10% | -2.9 | 2.60% |
| SunsetBeach | -4.6 | 2.80% | -0.7 | 1.40% | -2.3 | 1.80% |
| Average | -4.8 | 3.80% | -0.8 | 1.15% | -2.0 | 1.23% |

FIG. 15

| Sequence | HM16.19 vs. Proposed BD-BR (%) | HM16.19 vs. Bai *et al.* [1] BD-BR (%) | HM16.19 vs. Perez *et al.* [2] BD-BR (%) |
|---|---|---|---|
| BalloonFestival | -4.1 | -1.5 | -1.6 |
| FireEater2Clip4000r1 | -5.3 | -0.9 | -1.3 |
| Market3 | -4.4 | -1.3 | -1.4 |
| Market3Clip4000r2 | -7.5 | -1.8 | -2.5 |
| ShowGirl2TeaserClip4000 | -7.3 | -1.9 | -2.6 |
| PeopleInShoppingCenter | -5.8 | -0.6 | -0.7 |
| DayStreet | -5.9 | -0.8 | -1.4 |
| FlyingBirds | -7.5 | -1.7 | -2.7 |
| Tibul | -6.4 | -0.6 | -1.5 |
| AutoWelding | -4.9 | -1.0 | -2.2 |
| BikeSparklers | -6.9 | -1.2 | -2.8 |
| Cosmos_TreeTrunk | -5.7 | -1.5 | -1.9 |
| SunRise | -7.8 | -1.6 | -3.0 |
| SunsetBeach | -5.9 | -1.0 | -2.6 |
| Average | -6.1 | -1.2 | -2.0 |

FIG. 16

| Sequence | HM16.19 vs. Proposed BD-BR (%) | HM16.19 vs. Bai et al. [1] BD-BR (%) | HM16.19 vs. Perez et al. [2] BD-BR (%) |
|---|---|---|---|
| BalloonFestival | -3.0 | -0.8 | -1.6 |
| FireEater2Clip4000r1 | -1.9 | -0.6 | -1.3 |
| Market3 | -9.0 | -2.4 | -1.4 |
| Market3Clip4000r2 | -8.6 | -2.0 | -2.5 |
| ShowGirl2TeaserClip4000 | -2.3 | -0.8 | -2.6 |
| PeopleInShoppingCenter | -5.2 | -0.9 | -0.7 |
| DayStreet | -5.3 | -0.9 | -1.4 |
| FlyingBirds | -5.5 | -1.1 | -2.7 |
| Tibul | -5.6 | -1.2 | -1.5 |
| AutoWelding | -3.9 | -0.8 | -2.3 |
| BikeSparklers | -6.0 | -1.1 | -2.9 |
| Cosmos_TreeTrunk | -4.9 | -1.5 | -2.1 |
| SunRise | -7.0 | -1.5 | -3.2 |
| SunsetBeach | -5.4 | -1.3 | -3.0 |
| Average | -5.3 | -1.2 | -2.1 |

FIG. 17

| Sequence | HM16.19 | Bai et al. [1] | Perez et al. [2] | Proposed |
|---|---|---|---|---|
| BalloonFestival | 0.21 | 0.26 | 0.20 | 0.17 |
| FireEater2Clip4000r1 | 0.23 | 0.25 | 0.21 | 0.18 |
| Market3 | 0.32 | 0.31 | 0.31 | 0.23 |
| Market3Clip4000r2 | 0.55 | 0.57 | 0.53 | 0.51 |
| ShowGirl2TeaserClip4000 | 0.57 | 0.58 | 0.55 | 0.52 |
| PeopleInShoppingCenter | 0.54 | 0.55 | 0.52 | 0.46 |
| DayStreet | 0.71 | 0.73 | 0.72 | 0.63 |
| FlyingBirds | 0.68 | 0.71 | 0.66 | 0.57 |
| Tibul | 0.47 | 0.45 | 0.43 | 0.39 |
| AutoWelding | 0.41 | 0.43 | 0.40 | 0.35 |
| BikeSparklers | 0.66 | 0.68 | 0.62 | 0.54 |
| Cosmos_TreeTrunk | 0.55 | 0.57 | 0.52 | 0.49 |
| SunRise | 0.33 | 0.35 | 0.31 | 0.22 |
| SunsetBeach | 0.46 | 0.49 | 0.43 | 0.38 |
| Average | 0.48 | 0.50 | 0.46 | 0.40 |

FIG. 19

| Sequence | HM16.19 | Bai et al. [1] | Perez et al. [2] | Proposed |
|---|---|---|---|---|
| BalloonFestival | 0.07 | 0.07 | 0.06 | 0.05 |
| FireEater2Clip4000r1 | 0.03 | 0.04 | 0.03 | 0.03 |
| Market3 | 0.08 | 0.07 | 0.07 | 0.05 |
| Market3Clip4000r2 | 0.04 | 0.03 | 0.04 | 0.03 |
| ShowGirl2TeaserClip4000 | 0.05 | 0.06 | 0.05 | 0.04 |
| PeopleInShoppingCenter | 0.05 | 0.06 | 0.04 | 0.03 |
| DayStreet | 0.04 | 0.05 | 0.04 | 0.02 |
| FlyingBirds | 0.04 | 0.04 | 0.05 | 0.03 |
| Tibul | 0.05 | 0.06 | 0.04 | 0.03 |
| AutoWelding | 0.04 | 0.04 | 0.03 | 0.02 |
| BikeSparklers | 0.05 | 0.06 | 0.04 | 0.03 |
| Cosmos_TreeTrunk | 0.07 | 0.07 | 0.06 | 0.04 |
| SunRise | 0.05 | 0.05 | 0.05 | 0.03 |
| SunsetBeach | 0.08 | 0.07 | 0.07 | 0.05 |
| Average | 0.05 | 0.06 | 0.05 | 0.03 |

FIG. 20

| Sequence | HM16.19 | Bai et al. [1] | Perez et al. [2] | Proposed |
|---|---|---|---|---|
| BalloonFestival | 0.47 | 0.52 | 0.39 | 0.32 |
| FireEater2Clip4000r1 | 0.45 | 0.51 | 0.41 | 0.36 |
| Market3 | 0.61 | 0.63 | 0.66 | 0.45 |
| Market3Clip4000r2 | 0.74 | 0.99 | 0.98 | 0.99 |
| ShowGirl2TeaserClip4000 | 0.99 | 0.99 | 0.97 | 0.96 |
| PeopleInShoppingCenter | 0.98 | 0.96 | 0.94 | 0.41 |
| DayStreet | 1.33 | 1.32 | 1.32 | 1.23 |
| FlyingBirds | 1.32 | 1.30 | 1.30 | 1.01 |
| Tibul | 0.92 | 0.89 | 0.81 | 0.71 |
| AutoWelding | 0.78 | 0.80 | 0.76 | 0.69 |
| BikeSparklers | 1.21 | 1.23 | 1.16 | 1.02 |
| Cosmos_TreeTrunk | 0.96 | 0.97 | 0.94 | 0.88 |
| SunRise | 0.66 | 0.68 | 0.64 | 0.59 |
| SunsetBeach | 0.93 | 0.95 | 0.91 | 0.82 |
| Average | 0.88 | 0.91 | 0.87 | 0.75 |

FIG. 21

| Sequence | HM16.19 | Bai et al. [1] | Perez et al. [2] | Proposed |
|---|---|---|---|---|
| BalloonFestival | 0.13 | 0.15 | 0.13 | 0.09 |
| FireEater2Clip4000r1 | 0.07 | 0.09 | 0.05 | 0.07 |
| Market3 | 0.15 | 0.13 | 0.13 | 0.09 |
| Market3Clip4000r2 | 0.07 | 0.06 | 0.07 | 0.05 |
| ShowGirl2TeaserClip4000 | 0.09 | 0.11 | 0.10 | 0.07 |
| PeopleInShoppingCenter | 0.10 | 0.11 | 0.09 | 0.06 |
| DayStreet | 0.09 | 0.09 | 0.08 | 0.03 |
| FlyingBirds | 0.09 | 0.08 | 0.09 | 0.06 |
| Tibul | 0.08 | 0.11 | 0.08 | 0.07 |
| AutoWelding | 0.07 | 0.08 | 0.07 | 0.06 |
| BikeSparklers | 0.11 | 0.12 | 0.11 | 0.09 |
| Cosmos_TreeTrunk | 0.13 | 0.13 | 0.12 | 0.10 |
| SunRise | 0.11 | 0.11 | 0.10 | 0.09 |
| SunsetBeach | 0.15 | 0.16 | 0.14 | 0.11 |
| Average | 0.10 | 0.11 | 0.10 | 0.07 |

METHOD BASED ON GLOBAL RATE-DISTORTION OPTIMIZATION FOR RATE CONTROL IN VIDEO CODING

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to the field of rate control (RC) in video coding. More specifically, the present invention relates to methods and systems for global rate-distortion optimization-based RC for video coding.

BACKGROUND OF THE INVENTION

High dynamic range (HDR) technology will likely have a more profound impact on the human viewing experience than an increase in video resolution. Consequently, most camera devices can produce proper HDR images directly. The quality of HDR images is improved by significantly enhancing the contrast (i.e., the difference between the dark and bright areas of a scene) rather than by simply adding more pixels to the same display. Nowadays, the development of the HDR technology open up broad possibilities in civil and industrial applications.

Rate control (RC) is useful in High Efficiency Video Coding (HEVC) for applications such as real-time transmission, which are limited by the available storage and bandwidth resources. RC establishes a trade-off between distortion (D) and rate (R) to enable the generation of a compressed bit stream with the smallest possible distortion at a given bit rate.

In this regard, RC algorithms, which play an important role in HDR video coding, aim to achieve high RC accuracy and improve rate-distortion (R-D) performance. Accordingly, RC algorithms are developed to offer substantially enhanced coding performance. Numerous approaches have been conducted to improve RC optimization in HEVC. For example, Bai et al. [1] proposes a RC model for HDR contents by adapting bit allocation. Perez et al. [2] proposes a multi-R-λ model approach for RC in HEVC that accurately achieves a target bit rate while improving HDR content reconstruction quality. However, these proposed methods may have several shortcomings. For example, the multi-R-λ model approach using the mean square error (MSE) as the evaluation metric may lead to inefficiencies.

Furthermore, to enhance encoding performance in RC algorithms, game theory is often used for global optimization in coding tree unit-level (CTU-level) RC. Specifically, game theory can be applied to effectively resolve bit allocation problem in RC. However, cooperative game modelling considers only methods applied from a bit allocation perspective. That is, although many researchers have proposed several solutions for enhancing encoding performance in RC algorithms, global optimization is achieved mainly from the bit allocation perspective. In this regard, a parameter λ in R-D optimization, which serves as a Lagrange multiplier in a R-D model optimization, also influences encoding performance, and an approach for enhancing the R-D optimization from the perspective of the parameter λ has not been appropriately established yet. Therefore, there is a need in the art for a new approach for enhancing the R-D optimization from a perspective of the parameter λ in R-D optimization.

REFERENCES

[1] L. Bai, L. Song, R. Xie, L. Zhang, and Z. Luo, "Rate control model for high dynamic range video," in 2017 *IEEE Visual Communications and Image Processing (VCIP)*, December 2017, pp. 1-4.

[2] K. R. Perez-Daniel and V. Sanchez, "Luma-aware multi-model rate-control for hdr content in hevc," in 2017 *IEEE International Conference on Image Processing (ICIP)*, September 2017, pp. 1022-1026.

The disclosures of above references are incorporated herein by reference in their entirety.

SUMMARY OF THE INVENTION

In accordance with one aspect of the present invention, a method for video coding with global rate-distortion optimization-based rate control (RC) is provided as the following steps. Multiple frames of an input video are generated using a video coding system. One of the frames of the input video is divided into multiple coding tree units (CTUs) using the video coding system. One or more CTU level coding bits are determined through rate-distortion (R-D) performance optimization using the video coding system, comprising determining a Lagrange multiplier to compute rate and distortion for the i-th CTU of the j-th frame of the frames, wherein either i or j is a positive integer, and the Lagrange multiplier is determined by:

$$\lambda_i = \left(\frac{e^\phi}{c_i}\right)^{\frac{c_i+1}{c_i}} \frac{c_i}{k_i^{\frac{1}{c_i}}},$$

where $\lambda_i$ is the Lagrange multiplier for the i-th CTU, $c_i$ and $k_i$ are first and second model parameters for the i-th CTU, respectively, and $\phi$ is expressed by:

$$\phi = \frac{\sum_{i=1}^{N}\left(\frac{\ln(k_i c_i)}{c_i}\right) - N\ln\frac{R_c}{N}}{\sum_{i=1}^{N}\left(\frac{1}{c_i}\right)},$$

where $R_c$ is rate constraint and N is the number of the CTUs, and the computer rate and the distortion are computed by:

$$R_i = \left(\frac{\lambda_i}{c_i k_i}\right)^{-\frac{1}{c_i+1}},$$

$$D_i = \left(\frac{\lambda_i k_i^{\frac{1}{c_i}}}{c_i}\right)^{\frac{c_i}{c_i+1}},$$

where $R_i$ and $D_i$ are the rate and the distortion for the i-th CTU, respectively. The i-th CTU is encoded to generate a bit stream. The bit stream is outputted.

In accordance with another aspect of the present invention, a video coding system for executing the video coding method with the global rate-distortion optimization-based RC is provided. The video coding system at least includes an encoder configured to determine the CTU level coding bits and to execute an encoding process. In various embodiments, the video coding system further includes a transmission medium, a decoder for executing a decoding process. In some embodiments, the video coding system further includes a displayer to display a video stream decoded by the decoder from the bit stream.

By using this video coding method, an RC scheme for High dynamic range (HDR) in High Efficiency Video Coding (HEVC) is provided. Briefly, considering the characteristics of HDR image content, a rate-distortion (R-D) model based on HDR-Visual Difference Predictor (VDP)-2 for performance optimization is provided. In the optimization process, the λ is directly utilized rather than the bit rate to obtain the globally optimal solution. Finally, the model parameter estimation method is used to reduce errors. The video coding method of the present invention is verified that bit rate reduction on average can be achieved.

BRIEF DESCRIPTION OF THE DRAWINGS

Embodiments of the invention are described in more detail hereinafter with reference to the drawings, in which:

FIG. 4 lists fitting relationships between the estimated and actual values for various video sequences;

FIG. 6 lists prediction accuracy and mismatches for various video sequences;

FIG. 9 lists prediction accuracy and mismatches for various video sequences;

FIG. 10C illustrates a table of an algorithm for the video coding method of the present invention;

FIG. 11 lists an experimental configuration for different video sequences;

FIG. 12 shows performance of the video coding method of the present invention compared with other RC schemes in terms of HDR-VDP-2 (LDB);

FIG. 13 shows performance of the video coding method of the present invention compared with other RC schemes in terms of HDR-VQM (LDB);

FIG. 14 shows performance of the video coding method of the present invention compared with other RC schemes in terms of the mPSNR (LDB);

FIG. 15 shows performance of the video coding method of the present invention compared with other RC schemes in terms of HDR-VDP-2 (RA);

FIG. 16 shows performance of the video coding method of the present invention compared with other RC schemes in terms of HDR-VQM (RA);

FIG. 17 shows performance of the video coding method of the present invention compared with other RC schemes in terms of the mPSNR (RA);

FIG. 19 shows frame-level RC accuracy comparisons (%) (LDB);

FIG. 20 shows sequence-level RC accuracy comparisons (%) (LDB);

FIG. 21 shows frame-level RC accuracy comparisons (%) (RA);

FIG. 22 shows sequence-level RC accuracy comparisons (%) (RA);

FIG. 25 shows category results from the subjective assessment (MOS);

and

Figure 26:
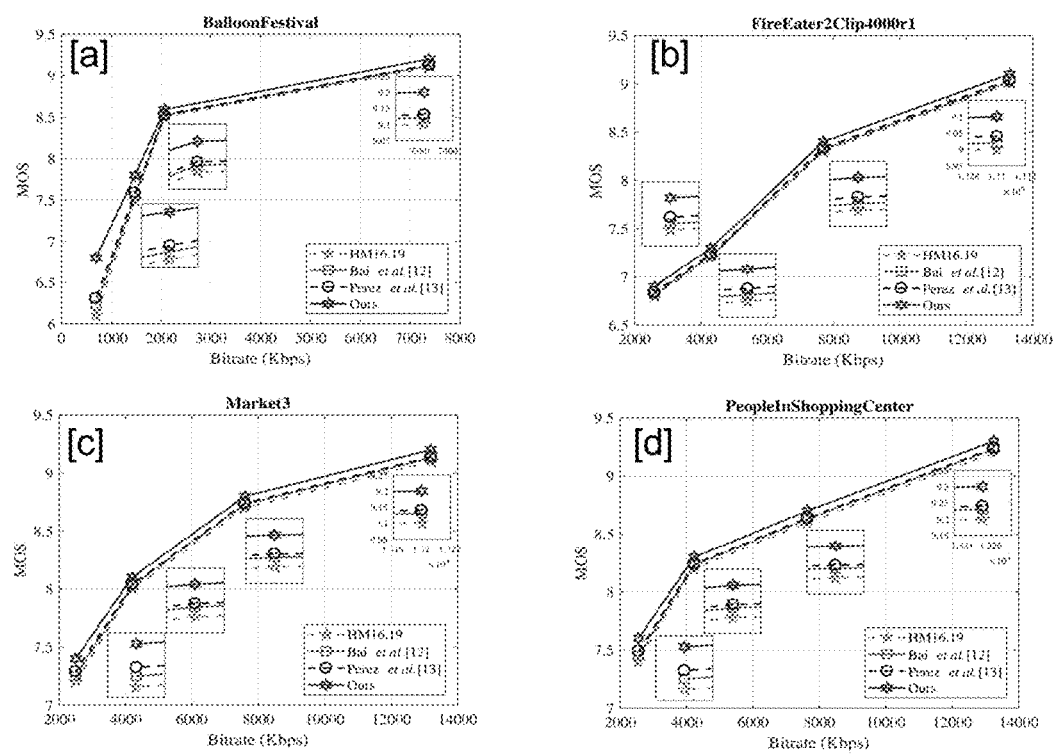

FIG. 26 shows buffer occupancy results for four typical sequences.

DETAILED DESCRIPTION

In the following description, global rate-distortion (R-D) optimization-based rate control (RC) methods and apparatuses for video coding, and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

The present invention provides the methods and apparatuses for video coding, which can be used for conducting to generate compressed bit streams. In accordance with various embodiments of the present invention, provided is a method that processes at least one high dynamic range (HDR) video and generates an encoded bit stream through global R-D optimization-based RC. In various embodiments, the provided method may be implemented in a video coding system.

Figure 1:
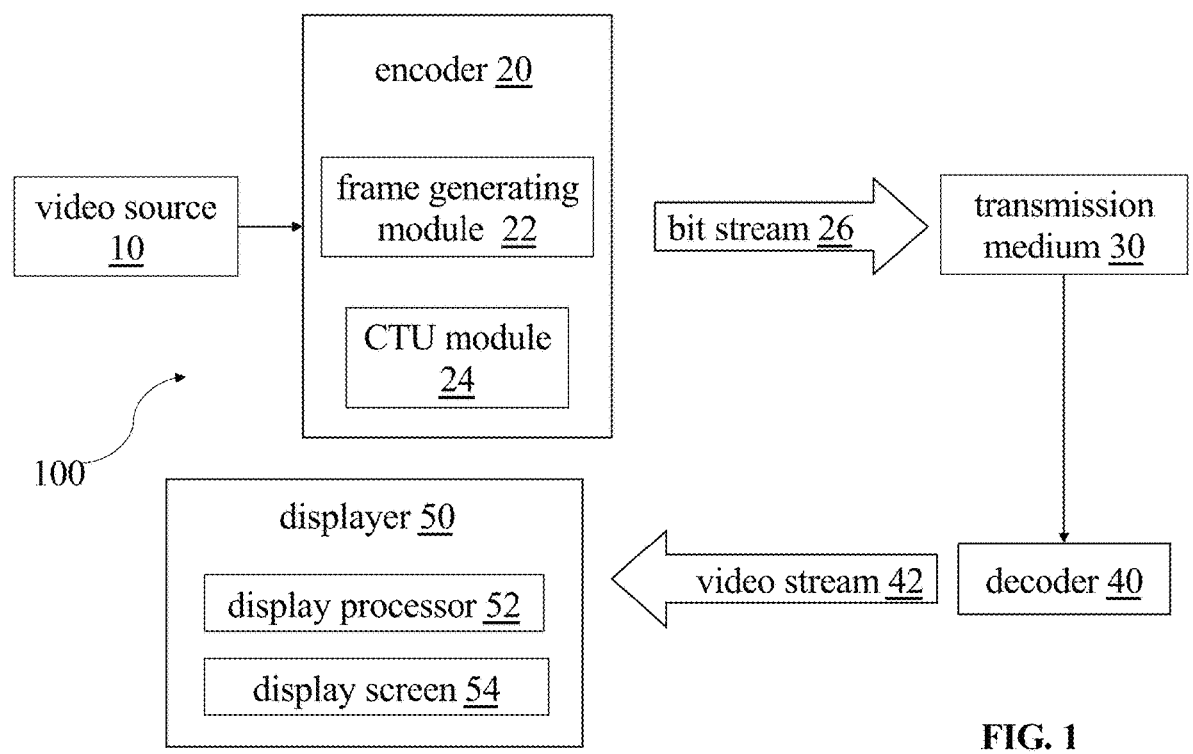
FIG. 1 illustrates a video coding system according to various embodiments of the present invention.

Referring to FIG. 1. Illustrated is a video coding system 100 according to various embodiments of the present invention. RC methods can be implemented in the video coding system 100 including an encoder 20, a transmission medium 30, a decoder 40, and a displayer 50. The components of the video coding system 100 can be realized by hardware, software, or a combination thereof. In various embodiments, the software may be machine code, firmware, embedded code, and application software. In various embodiments, the hardware may be specially configured electronic circuitries, processors, digital signal processors, microprocessors, computers, integrated circuits, integrated circuit cores, passive devices, and/or combinations thereof.

The encoder 20 is configured to receive and encode a video from a video source 10. The term "video" as used herein means a digital representation of one or more objects, and it may contain standard dynamic range (SDR) content, high dynamic range (HDR) content, or a combination thereof (e.g. mixed content). In various embodiments, the encoder 20 can also be referred to as a video encoder.

Encoding is defined as computationally modifying the video source 10 to a different form. The encoding includes data compression, in which data amounts may be reduced, enhancements, resolution changes and aspect ratio changes. In one embodiment, the encoding may be performed according to High-Efficiency Video Coding (HEVC) standard. In one embodiment, the encoder 20 includes a frame generating module 22 and a CTU module 24. In response to the video from the video source 10, the frame generating module 22 is configured to generate frames, and the CTU module 24 is configured to divide at least one of the frames into one or more CTUs.

The video encoded by the encoder 20 forms a bit stream 26 that represents information from the video source 10. The bit stream 26 is transmitted or transferred to the decoder 40 via the transmission medium 30. In various embodiments, the transmission medium 30 may be a wired or wireless communication network or a file transfer to the decoder 40.

The decoder 40 is configured to take the bit stream 26 and create a video stream 42, which is a computationally modified version of the video source 10. In various embodiments, the decoder 40 may create the video stream 42 having properties different from the video source 10, such as a different frame rate, different resolution, different color parameters, different view order, different aspect ratio, a different frame rate, or combinations thereof.

The video stream 42 is transmitted to a displayer 50 comprising a display processor 52 and a display screen 54. In one embodiment, the decoder 40 communicates with the displayer 50 via a wired or wireless communication network. The display processor 52 is configured to receive the video stream 42 from the video decoder 40 and display the video stream 42 onto the display screen 54.

Figure 2:
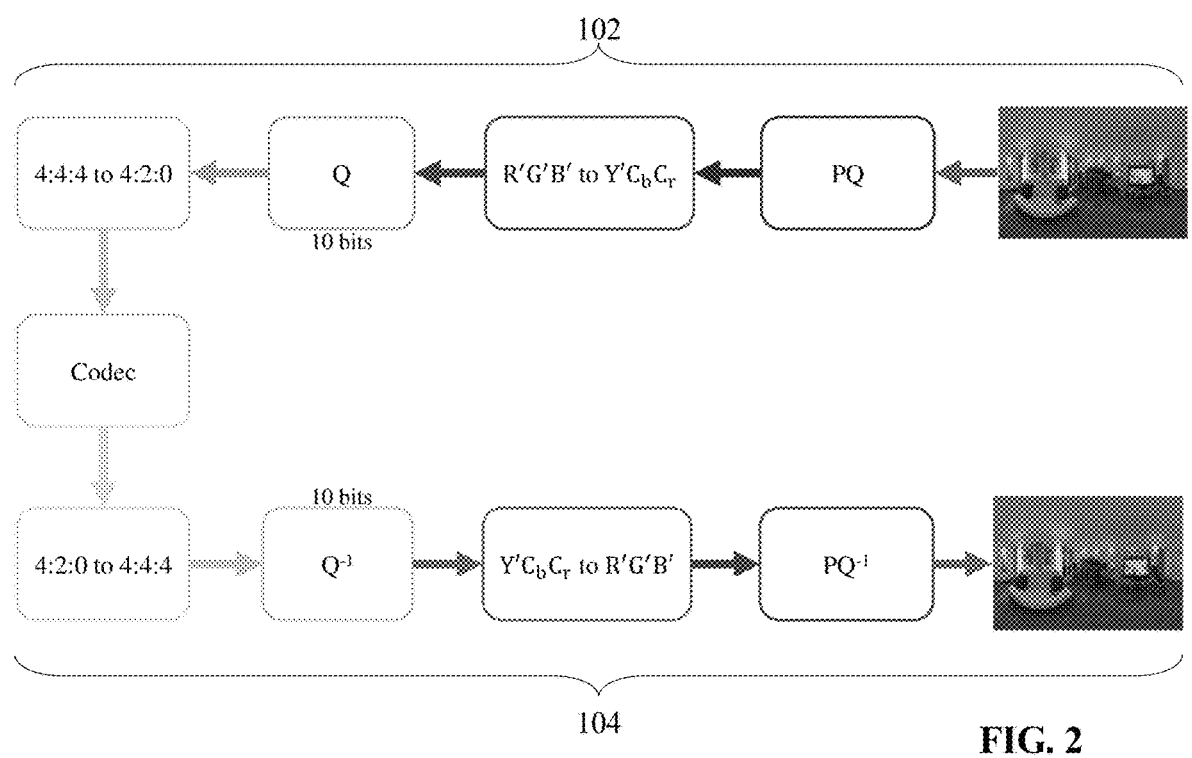
FIG. 2 is a workflow for encoding and decoding video streams.

More specifically, referring to FIG. 2, which depicts a workflow for encoding and decoding video streams, the video coding system (e.g. the video coding system 100 in FIG. 1) is configured to execute an encoding stage 102 and a decoding stage 104 including multiple steps. In the encoding stage, a perception quantizer (PQ) is adopted to perform perceptual coding of HDR video data. Subsequently, the video data is converted into the Y'CbCr chromatic aberration space through 10-bit quantization, and then the chrominance channel is reduced to 4:2:0 and compressed, so as to form a bit stream in codec. In the decoding stage, the above steps can be inverted. Note that by adding metadata to the bit stream, one can tone map decoded HDR content for presentation on SDR displayers. The workflow for the tone mapping of HDR content is similar to the perceptual encoding workflow shown in FIG. 2, except that in this case, the PQ is replaced by a tone mapping operator (TMO).

In the present invention, the global R-D optimization-based RC can be performed in accordance to a R-D model. In one embodiment, the R-D model is based on HDR-Visual Difference Predictor (VDP) with a second version (also referred to HDR-VDP-2). To illustrate, modelling rate (R) and distortion (D) of HDR video coding in HEVC is provided as follows, which analyses the R-D characteristics of a HDR video as applied to HDR RC.

Minimization of distortion (D) is subjected to a rate constraint $R_c$ that constitutes the foundation of RC, which can be expressed as:

$$\min\{D\}, \text{ s.t. } R \leq R_c \tag{1}$$

A Lagrangian optimization method can be used to solve this constrained problem in hybrid video coding. A Lagrangian cost function can be expressed as:

$$J = D + \lambda \times R; \tag{2}$$

where J is a rate-distortion cost (R-D cost); D is a distortion; $\lambda$ is a Lagrange multiplier; and R is a bit rate (i.e. a coding bit rate). The R-D curve in video coding can be observed to be convex. The bit rate R and the distortion D are clearly different, and the Lagrange multiplier $\lambda$ can be expressed as:

$$\lambda = -\frac{\partial D}{\partial R}. \tag{3}$$

A R-D model can be established to characterize the correlation between the bit rate R and the distortion D, such as that expressed by an exponential function shown as equation (4):

$$D(R) = kR^{-c}; \tag{4}$$

where k and c are model parameters related to the features of the source. That is, taking a video content from a video source (e.g. the video source 10 in FIG. 1) into consideration, the model parameters k and c are depend on the video content.

Figure 3:
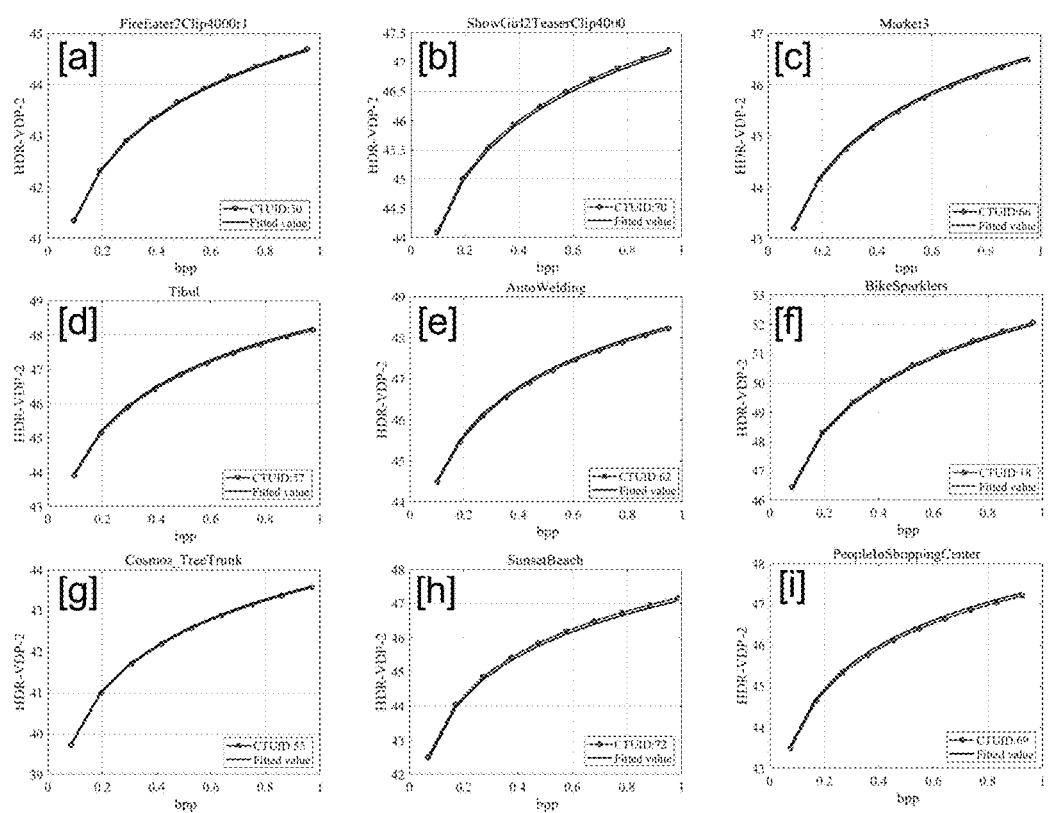
FIG. 3 illustrates actual and fitted R-D relationships.

Experiments were conducted to validate the model of the present invention based on HEVC. Herein, the "IBBB coding" configuration is considered in the experiments, and the R-D curves fit in accordance with this model for several example video sequences are shown in FIG. 3, which illustrates the actual and fitted R-D relationships. As shown in graphs (a)-(i) of FIG. 3, satisfied fitting results are obtained at not only frame level but also CTU level, in which the bit rate R is expressed in units of bits per pixel (bpp) while the distortion D is expressed in terms of the HDR-VDP-2.

In order to measure how well the model fits the experimental observations, an approach of calculating an average Pearson correlation coefficient (PCC) is used for verification. Fourteen different test sequences in total are considered to verify the linear relationship between the estimated and actual values, and the correlation coefficient results are listed in the table shown in FIG. 4, which also lists the fitting relationships between the estimated and actual values for various video sequences. The average PCC between the estimated and actual values using the model of the present invention is approximately 0.95, thus proving that the model of the present invention can achieve accurate fitting across many different sequences.

According to the equation (4), the bit rate R can be expressed as:

$$R = \left(\frac{k}{D}\right)^{\frac{1}{c}}. \tag{5}$$

Similarly, according to the equation (4), the Lagrange multiplier $\lambda$ can be expressed as:

$$\lambda = c \times k \times R^{-c-1}. \tag{6}$$

By substituting the equation (5) into the equation (6), the Lagrange multiplier $\lambda$ can be rewritten as:

$$\lambda = c \times k^{-\frac{1}{c}} D^{\frac{c+1}{c}}. \tag{7}$$

In the present disclosure, a proper Lagrange multiplier $\lambda$ is determined for each CTU to achieve accurate bit rate control in HEVC. Given optimization strategy, $CTU_1$, $CTU_2, \ldots, CTU_N$, will receive utilities of Lagrange multipliers $\lambda_1, \lambda_2, \ldots, \lambda_N$, respectively, where N is a positive integer and is the number of the CTUs. The bit rate R of the i-th CTU is as equation (8), in which i is a positive integer less than or equal to N.

$$R_j = \left(\frac{\lambda_i}{c_i k_i}\right)^{-\frac{1}{c_i+1}}. \tag{8}$$

Similarly, the distortion D of the i-th CTU is expressed as:

$$D_j = \left(\frac{\lambda_i k_i^{\frac{1}{c_i}}}{c_i}\right)^{\frac{c_i}{c_i+1}}. \tag{9}$$

Therefore, the minimization of distortion D subject to the rate constraint is expressed as:

$$\{\lambda_1^*, \lambda_2^*, \ldots, \lambda_N^*\} = \text{argmin} \sum_{i=1}^{N} D(\lambda_i), \tag{10}$$

$$\text{s.t.} \sum_{i=1}^{N} R(\lambda_i) \le R_c.$$

A unique solution $\lambda^* = [\lambda_1^*, \lambda_2^*, \ldots, \lambda_N^*]$ can be obtained from equation (10) in accordance with Lagrangian theory. A Karush-Tuhn-Tucker (KKT) conditional solution is an effective way to solve this problem to obtain a possible solution $\lambda^*$ set that satisfies the KKT conditions for the equation (10). However, it is necessary to determine whether a certain solution $\lambda^*$ exists that leads to a solution that satisfies the KKT conditions, which requires an exhaustive search that may not be feasible for practical low-latency video applications. For such problems, a more effective solution may be needed.

Because the budget is a power function of the Lagrange multiplier $\lambda$, the constraint $$\sum_{i=1}^{N} R_i \le R_c$$

is relaxed to $$\prod_{i=1}^{N} R_i \le \left(\frac{R_c}{N}\right)^N.$$

By constructing the Lagrangian cost function for the unconstrained version of the problem expressed in the equation (10) and substituting the equation (9) into the equation (10), equation (11) is obtained.

$$L = \sum_{i=1}^{N} \left(\frac{\lambda_i k_i^{\frac{1}{c_i}}}{c_i}\right)^{\frac{c_i}{c_i+1}} + u\left(\sum_{i=1}^{N} \ln\left(\frac{\lambda_i}{c_i k_i}\right)^{-\frac{1}{c_i+1}} - N\ln\left(\frac{R_c}{N}\right)\right), \tag{11}$$

where L is a Lagrangian cost function; and u is a Lagrange multiplier. Based on the equation (11), a closed-form solution for the solution $\lambda^*$ can be found.

Subsequently, a RC-scheme-based optimal solution is provided, which includes obtaining the optimal Lagrange multiplier and updating the model parameters.

Since different bit rate allocation methods will yield different results, a top-down bit rate allocation method cannot achieve the optimal quality. Thus, in the present disclosure, a global optimization method is provided. There are similar motivations for developing a global optimization approach for the collaborative RC of different CTUs. Moreover, HDR and SDR videos have completely different R-D characteristics. The development of a global optimization method thus emerges as an increasingly important problem in HDR RC. Once a method for enhancing the R-D performance from the Lagrange multiplier $\lambda$ perspective is not established well, it is difficult to realize the goal of the global optimization.

Consider a utility vector representing one possible combination of utility values, which is denoted by $U_m = (\lambda_1^m, \lambda_2^m, \ldots, \lambda_N^m)$, $m \in [0, M]$, where M is the number of possible utility combinations. The minimum utilities for all CTUs are defined as $U_* = (\lambda_1^*, \lambda_2^*, \ldots, \lambda_N^*)$. It can be proved that the utility set $U = (U_1, U_2, \ldots, U_M)$ is nonempty and bounded and that the set of feasible utilities U is convex, meaning that it is possible to achieve optimal CTU-level RC performance.

As indicated in Lagrange's theory, if the minimum value of the Lagrange multiplier $u^*$ in the equation (11) can be obtained at the Lagrange multiplier $\lambda^* = [\lambda_1^*, \lambda_2^*, \ldots, \lambda_N^*]$, then the Lagrange multiplier $\lambda^*$ is an optimal solution to the equation (11). Furthermore, the optimization of the Lagrange multiplier $\lambda^*$ is guaranteed by the KKT conditions when the equation (11) is used to minimize a convex and differentiable function on a convex set.

Once the point of the Lagrange multipliers $\lambda_1^*, \lambda_2^*, \ldots, \lambda_N^*$ meets the KKT conditions, as given in the equation (11), this point represents the global minimum optimization solution. The conditions are collected as:

$$\begin{cases} c_i < 0, i = 1, \ldots, N & \text{(i)} \\ k_i > 0, i = 1, \ldots, N & \text{(ii)} \\ \lambda_i > 0, i = 1, \ldots, N & \text{(iii)} \\ \nabla L_{\lambda_i^*, u^*} = 0 & \text{(vi)} \\ u^* \left(\sum_{i=1}^{N} \ln\left(\frac{\lambda_i^*}{c_i k_i}\right)^{\frac{-1}{c_i+1}} - \ln\left(\frac{R_c}{N}\right)^N\right) = 0 & \text{(v)} \end{cases} \tag{12}$$

According to (vi) of the equation (12), the Lagrange multiplier $\lambda_i$ can be expressed as equation (13).

$$\lambda_i = \left(\frac{u}{c_i}\right)^{\frac{c_i+1}{c_i}} \frac{c_i}{k_i^{\frac{1}{c_i}}}, \tag{13}$$

where $u \ne 0$ is known from the condition of (v) of the equation (12). By substituting the equation (13) into condition (v) of the equation (12), equation (14) is obtained.

$$\sum_{i=1}^{N} -\frac{1}{c_i+1}\left(\ln\left(\left(\frac{u}{c_i}\right)^{\frac{c_i+1}{c_i}} \frac{c_i}{k_i^{\frac{1}{c_i}}}\right) - \ln c_i k_i\right) - N\ln\frac{R_c}{N} = 0. \quad (14)$$

The equation (14) can be further rewritten as equation (15):

$$\sum_{i=1}^{N}\left(-\frac{1}{c_i}\ln u + \frac{1}{c_i}\ln k_i + \frac{1}{c_i}\ln c_i\right) - N\ln\frac{R_c}{N} = 0. \quad (15)$$

The equation (15) can be rewritten as equation (16):

$$\sum_{i=1}^{N}\frac{1}{c_i}\ln u = -N\ln\frac{R_c}{N} + \sum_{i=1}^{N}\left(\frac{1}{c_i}\ln k_i + \frac{1}{c_i}\ln c_i\right). \quad (16)$$

Accordingly, the result as equation (17) is obtained:

$$\ln u = \frac{\sum_{i=1}^{N}\left(\frac{\ln(k_i c_i)}{c_i}\right) - N\ln\frac{R_c}{N}}{\sum_{i=1}^{N}\left(\frac{1}{c_i}\right)} = \phi. \quad (17)$$

By substituting the equation (17) into the equation (13), the optimal Lagrange multiplier $\lambda_i^*$ is obtained as equation (18):

$$\lambda_i^* = \left(\frac{e^{\phi}}{c_i}\right)^{\frac{c_i+1}{c_i}} \frac{c_i}{k_i^{\frac{1}{c_i}}}. \quad (18)$$

Next, an update of the model parameters is executed as follows. In this regard, it is not easy to obtain the model parameters before the encoding process, the optimal parameters are estimated by using an updating strategy. For the updating strategy, the aim is to minimize the difference between a true distortion $D_{real}$ and a estimated distortion $D_{comp}$ of the same CTU. A squared error e between the true distortion $D_{real}$ and the estimated distortion $D_{comp}$ is expressed as:

$$e^2 = (\ln D_{real} - \ln D_{comp})^2. \quad (19)$$

Based on the adaptive least mean squares (LMS) method with one iteration, the model parameters $k_{old}$ and $c_{old}$ can be updated to obtain the model parameters $k_{new}$ and $c_{new}$ as the following equations (20) and (21):

$$k_{new} = k_{old} + \sigma_\alpha (\ln D_{real} - \ln D_{comp}) \cdot k_{old}; \quad (20)$$

$$c_{new} = c_{old} + \sigma_\beta (\ln D_{real} - \ln D_{comp}) \cdot \ln R_{real}; \quad (21)$$

where coefficients $\sigma_\alpha$ and $\sigma_\beta$ are set as constants; and parameter $R_{real}$ is an actual bitrate of the co-located CTU.

Herein, the relationship between the old and new model parameters (e.g. $k_{old}$ and $k_{new}$) may be the values of the model parameter k for the CTU in the current frame and the co-located CTU in the previous frame. For example, if the model parameter $k_{new}$ corresponds to the i-th CTU in the j-th frame of the frames, the model parameter $k_{old}$ might correspond to the co-located CTU (e.g. the i-th CTU in the (j-1)-th frame), in which either of i or j is a positive integer.

In HDR video compression, an HDR-VDP-2-based approach can be used to estimate the true distortion $D_{real}$. The distortion of the current CTU is similar to the co-located position of the previous frame, and therefore, to reduce the computational complexity, the distortion of the co-located CTU can be used to obtain $D_{comp}$. In various embodiments, the coefficients $\sigma_\alpha$ and $\sigma_\beta$ can be set to 0.1 and 0.05, respectively.

Figure 5:
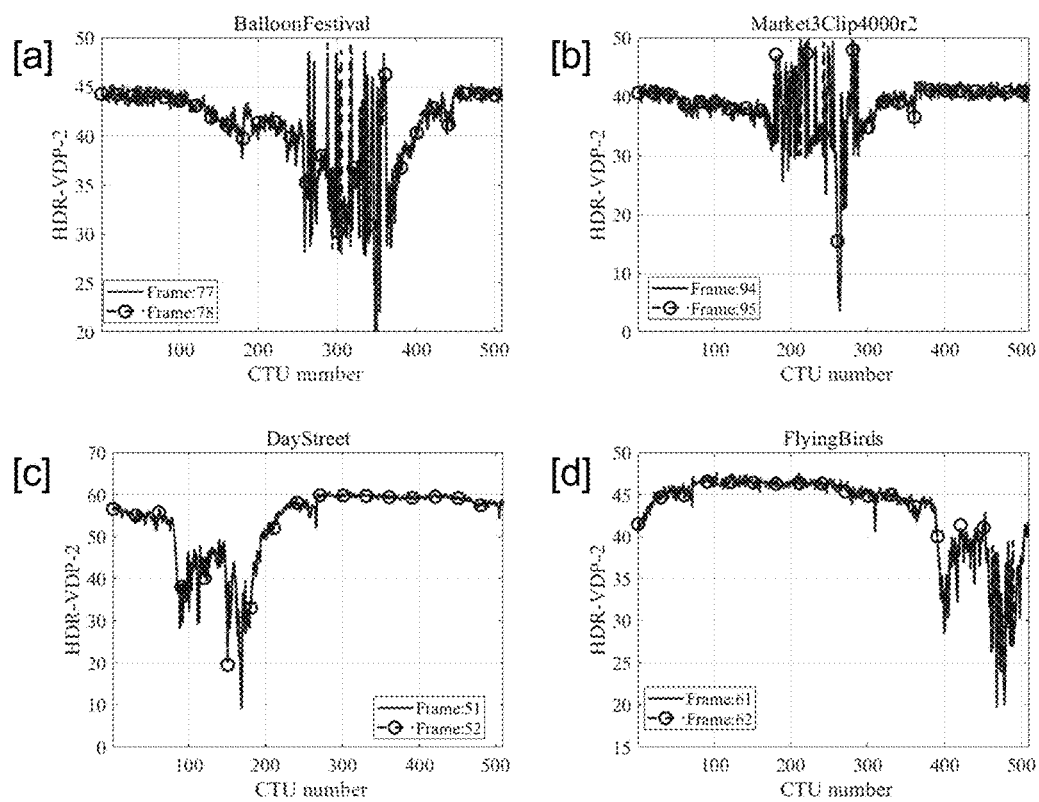
FIG. 5 shows the relationship between the distortion of the current CTU and that of the co-located CTU in the previous frame in four typical sequences when the LDB coding configuration is used.

FIG. 5 shows the relationship between the distortion of the current CTU and that of the co-located CTU in the previous frame in four typical sequences when the low-delay B (LDB) coding configuration is used. As shown in FIG. 5, differences between the distortion of each current CTU and the distortion of the co-located CTU in the previous frame are slight. More detailed experimental results are shown in a table in FIG. 6 which lists prediction accuracy and mismatches for various video sequences. The PCC and the normalized root mean square error (NRMSE) are employed to measure the estimation accuracy and error. As indicated in the table in FIG. 6, the assumption as above is valid, and the PCCs with the neighbouring distortions range from 0.93 to 0.98. In addition, the average NRMSE of the neighbouring distortions is 0.0779, indicating that on average, the distortion of the current CTU is very close to that of the co-located CTU in the previous frame for the HDR video sequences. These experiments show that because the distortion of the current CTU is close to that of the CTU in the corresponding location in the previous frame, the neighbouring distortion model is able to achieve high accuracy. Therefore, to reduce the computational complexity, the distortion of the co-located CTU is used to obtain $D_{comp}$.

In some cases, Lagrange multipliers λ and QP values in the CTU-level are clipped based on the frame-level parameters to avoid quality fluctuations. However, the R-D curves of HDR CTUs and SDR CTUs may be different, meaning that the Lagrange multipliers λ and QP values of HDR and SDR CTUs may be incorrectly clipped if the same frame-level parameters are used for both. Therefore, distinguishing between different parts of a frame with different R-D characteristics can enhance the video coding efficiency.

A strategy is given for content classification as follows. For HDR content encoded with 10-bit precision, luma values are in a range of [513, 1024] for Class A CTUs, where the luma values are related to the HDR content; for Class B CTUs, luma values are in a range of [0, 512], where the luma values are related to the SDR content; and values for Class C CTUs span an entire value range. To illustrate, the Class A CTUs related to the HDR content is referred to as an HDR region; the Class B CTUs related to the SDR content is referred to as an SDR region; and the Class C CTUs related to the mixed content is referred to as a Mixed region.

In some embodiments, regarding initial values of c and k used in the equations (20) and (21), for HDR regions, the initial values are set to 34.64 and −0.036, respectively; for SDR regions, the initial values are set to 34.22 and −0.031, respectively; and for Mixed regions, the initial values are set to 34.40 and −0.034. These initial values are obtained by averaging fitted values of c and k from fits such as those shown in FIG. 3. Moreover, characteristics of the R-D curves for different HDR CTUs are verified and analysed based on randomly selected representative sequences.

Figure 7:
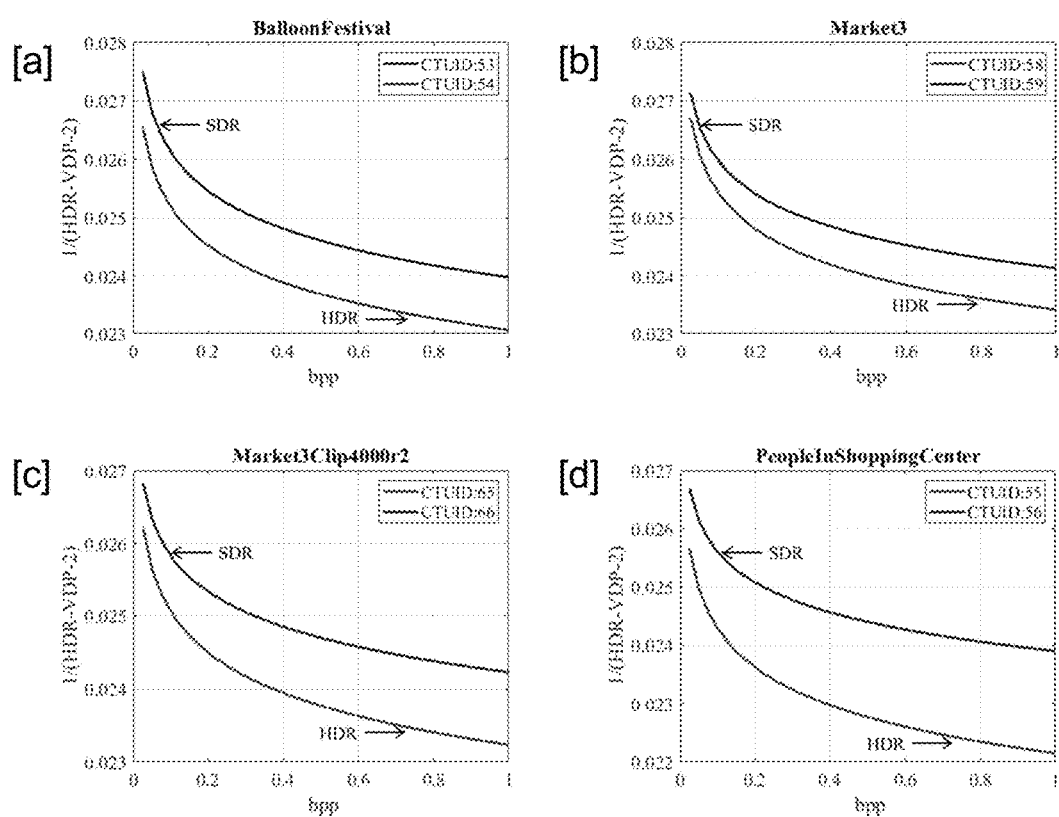
FIG. 7 illustrates R-D curves of adjacent CTUs in various sequences.
Figure 8:
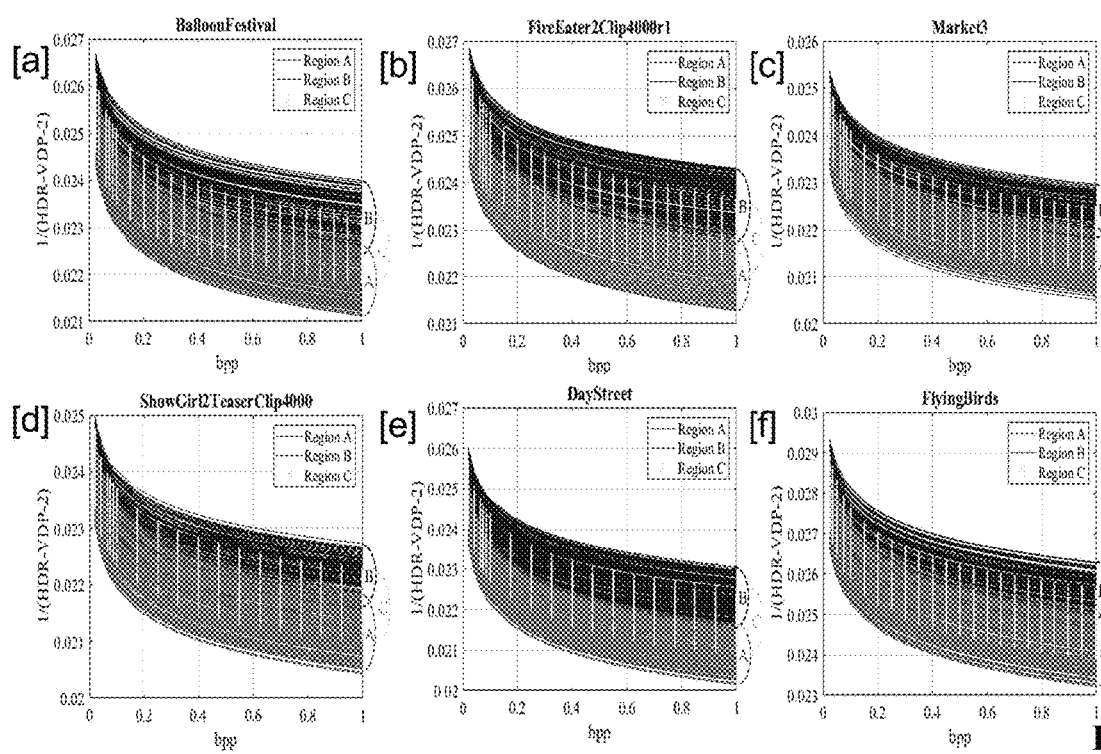
FIG. 8 shows the R-D curves for the entire frame.

As shown in FIG. 7 illustrating R-D curves of adjacent CTUs in various sequences, each of graphs (a)-(d) shows two R-D curves of adjacent CTUs belonging to different regions, and the graphs readily illustrates that for HDR content, the λ curve declines more rapidly, suggesting that HDR content requires a lower bit rate than SDR content does. For comparison, FIG. 8 shows the R-D curves for the entire frame. From graphs (a)-(f) in FIG. 8, it can be seen that compared with SDR content, HDR content possesses completely different R-D characteristics. Accordingly, the R-D curves can be categorized in accordance with the different R-D characteristics. For example, the R-D curves for different types of regions can be easily separated, and the R-D curves for different HDR regions can be readily combined. Fourteen representative HDR video sequences were tested to obtain the R-D relationships of the CTUs, and the results are shown in a table in FIG. 9, which also lists the prediction accuracy and mismatches for various video sequences. For most sequences, the parameter value ranges of the HDR and SDR models are different, and it is feasible to identify specific corresponding value intervals. For most sequences, over 90% of the actual values fall within the given HDR and SDR value intervals.

The above mechanical is to divide the CTUs into only three regions (e.g. the Class A CTUs related to the HDR content, the Class B CTUs related to the SDR content, and the Class C CTUs related to the mixed content). Such division is sufficient for accurate CTU-level R-D modelling while resulting in sufficiently low complexity for real-time coding. On the contrary, once a video source is divided into multiple regions (e.g. more than three regions) through more complex methods, multi-class classifiers in use typically have high computational complexity, which is not suitable for real-time video coding and cannot guarantee high classification accuracy.

In accordance to one embodiment of the present invention, in order to divide the CTUs into only three categories, a region level is added between the frame level and the CTU level. In this regard, corresponding region-level parameters are in place of the original frame-level parameters to restrict the CTU-level model parameters.

Figure 10A:
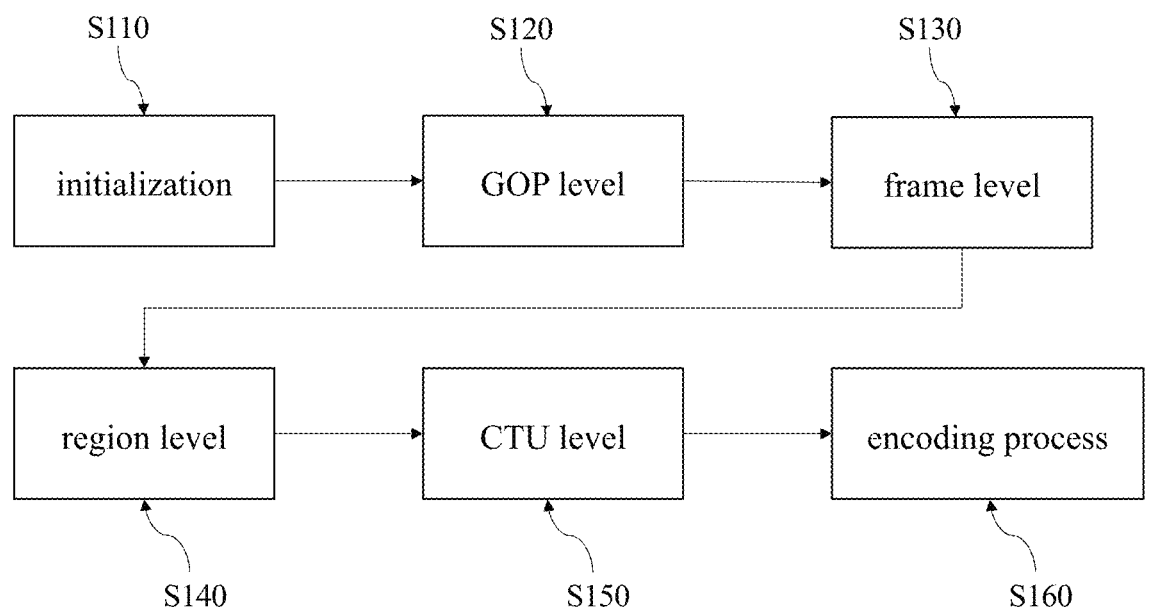
FIG. 10A is a flowchart of a method for video coding according to various embodiments of the present disclosure.

Referring to FIG. 10A, which depicts a flowchart of a method for video coding according to one embodiment of the present invention. The method for video coding includes steps S110, S120, S130, S140, S150, and S160. The step S110 is an initialization stage; the step S120 is a group of pictures (GOP) level stage; the step S130 is a frame level stage, the step S140 is a region level stage; the step S150 is a CPU level stage; and the step S160 is an encoding process stage. The method illustrated in FIG. 10A can be executed by a video coding system (e.g. the video coding system 100 of FIG. 1). In one embodiment, the method is implemented by a processing server having at least one specially configured computer processor or a processing server system comprising a cluster of more than one processing servers. These include workstations, computing clusters, server farms, Cloud servers, and combinations thereof.

The stages as shown in FIG. 10A can be collected as a RC process for an input video (e.g. a video from a video source). The afore-described video coding processes can be executed in these stages, such as generating multiple frames of the input video and dividing one of the frames of the input video into multiple CTUs, and hence the descriptions similar or identical to those processes are omitted.

In step S110, the initialization stage is executed to initialize encoding parameters, bit allocation, buffer status, or combinations thereof. In steps S120 and S130, the GOP level and frame level stages are executed according to information of information of buffer status and total bit-rate budget. In analogous to the GOP level, the bit allocation in the frame and CTU level stages is achieved based on the weighting factors of each picture and CTU, respectively.

Figure 10B:
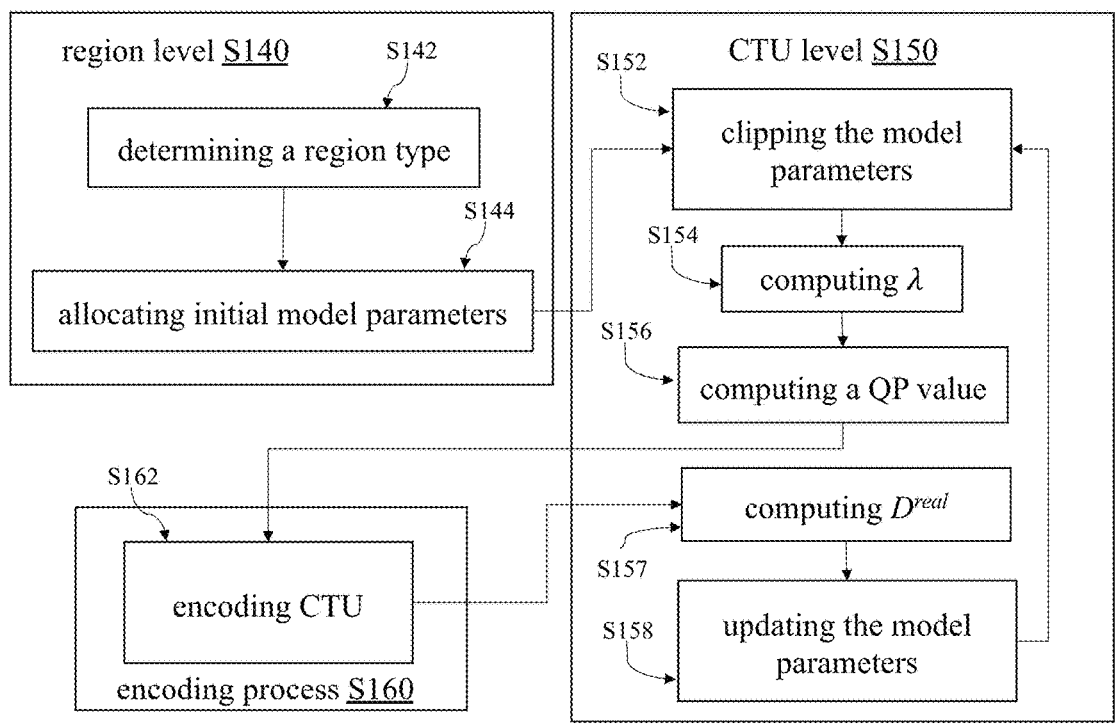
FIG. 10B is a flowchart for the region level and CTU level stages of FIG. 10A.

In steps S140 and S150, the region level stage and the CTU level stage are executed, such that the video content classification is applied and the R-D model is introduced subsequently. Referring to FIG. 10B, which depicts a flowchart for the region level and CTU level stages as shown in FIG. 10A, each of the region level stage, the CPU level stage, and the encoding process stage includes one or more steps.

In step S140, the region level includes steps S142 and S144, in which the step S142 is to determine a region type and the step S144 is allocating initial model parameters. In step S142, a region type to which one of the CTUs of the frame belongs is determined according to a luma value of the corresponding CTU. As afore-described, there is a target luma range divided into two continuous intervals, a first interval with [0, 512] and a second interval with [513, 1024], which are independent of each other, and thus the region type can be evaluated as an SDR region, an HDR region, or a Mixed region. In step S144, initial model parameters c and k are allocated. To illustrate, the model parameter c is referred to as a first model parameter, and the model parameter k is referred to as a second model parameter. Accordingly, step S144 is executed to allocate an initial first model parameter and an initial second model parameter according to the region type of the CTU. As afore-described, values of a first set of the initial first and second model parameters for the SDR region, values of a second set of the initial first and second model parameters for the HDR region, and values of a third set of the initial first and second model parameters for the Mixed region are different (i.e. different than each other). In some embodiments, the values of the initial first and second model parameters for the SDR region are 34.22 and −0.031 respectively; the values of the initial first and second model parameters for the HDR region are 34.64 and −0.036 respectively; and the values of the initial first and second model parameters for the Mixed region are 34.40 and −0.034 respectively.

Thereafter, the first and second model parameters are transmitted to the CTU level stage of step S150, in which the CTU level stage includes steps S152, S154, S156, S157, and S158. The step S152 is clipping the model parameters; the step S154 is computing λ; the step S156 is computing a QP value; the step S157 is computing $D^{real}$; and the step S158 is updating the model parameters.

In step S152, the model parameters are transmitted from the region level stage, and these parameters may be the initial model parameters allocated by step S144. In other embodiments, the model parameters transmitted from the region level stage may use the model parameters for the CTU in the co-located position in the previous frame as the model parameters for the current CTU. The model parameters can be clipped as follow.

For the first model parameter c, a first reference value $c_{region}$ is computed first, which is an average of the first model parameters for all of the CTUs in one of the frames. Then, the first model parameter of the current CTU is compared with the first reference value. If the first model parameter is larger than the first reference value, the first model parameter is clipped by: $\max(c_i, c_{region}*\exp(-2.0))$. If the first model parameter is less than or equal to the first reference value, the first model parameter is clipped by: $\min(c_i, c_{region}*\exp(1))$.

For the second model parameter k, a second reference value $k_{region}$ is computed first, which is an average of the second model parameters for all of the CTUs in one of the frames. Then the second model parameter of the current CTU is compared with the second reference value. If the second model parameter is larger than the second reference value, the second model parameter is clipped by: max($k_i$, $k_{region}$*exp(−2.0)). If the second model parameter is less than or equal to the second reference value, the second model parameter is clipped by: min($k_i$, $k_{region}$*exp(1)).

After clipping the first and second model parameters, step S154 is executed for obtaining one or more CTU level coding bits by introducing the clipped first and second model parameters. Specifically, as the afore described R-D performance optimization, equation (18) is used to determine a Lagrange multiplier λ which may serve as an optimal solution. The optimal solution can further be used to determine bit rate and distortion for the current CTU, as recited in equations (8) and (9). Thereafter, step 156 is executed to compute a $QP_i$ value for the current CTU in the CTU level by: $QP_i = \lfloor a \times \ln(\lambda_i + b + 0.5 \rfloor$, where coefficients a and b are constants.

The result of step S156 can be fed to step S160 of the encoding process stage, which includes step S162 for encoding CTU. In step S162, the current CTU is encoded by introducing the $QP_i$ value, so as to encoding the current CTU to generate a bit stream. In some embodiments, the bit stream is outputted for a practical application. For example, the bit stream can be transmitted to a decoder (e.g. the decoder 40 of FIG. 1) for decoding the bit stream, so as to generate a video stream and display video content based on the video stream by a displayer (e.g. the displayer 50 of FIG. 1).

Next, step S157 is executed by using HDR-VDP-2 to estimate the true distortion $D_{real}$. Step S158 is executed after step S152. In step S158, the first and second model parameters of the current CTU are updated to obtain the next model parameters for the next CTU. Herein, the "current" CTU may be the i-th CTU of the j-th frame and the next CUT may be the i-th CTU of the (j+1)-th frame, in which either i or j is a positive integer, and thus the current CTU serves as the co-located CTU to the next CTU of the (j+1)-th frame. The updating approach can be executed by the equations (20) and (21). In various embodiments, the updated model parameters can be brought to the step 152 to clip those again, and the clipping result is used for computing an optimal solution λ for the next CTU. In other words, the updating approach goes by iteration. In various embodiments, an algorithm can be compiled to execute the above processes or stages, as shown in FIG. 10C which illustrates a table of an algorithm for the video coding method of the present invention.

The following provides the verification of the afore-described video coding method through experiments on encoding HDR sequences with HEVC reference software. The performance was evaluated based on ten HDR video sequences with the following characteristics: a resolution of 1920×1080 pixels, 10-bit precision and the 4:2:0 format. The experiments are carried out based on the HEVC reference software HM16.19. Two other RC schemes were also implemented for comparison: those of "Bai et al. [1]" and "Perez et al. [2]". For the comparisons, the HDR-VDP-2, VQM and mPSNR metrics are used for quality evaluation. The dataset used for the subjective evaluation tests consisted of fourteen HD-resolution HDR video sequences: BalloonFestival, FireEater2Clip4000r1, Market3, Market3Clip4000r2, ShowGirl2TeaserClip4000, PeopleInShoppingCenter, Day Street, FlyingBirds, Tibul, AutoWelding, BikeSparklers, Cosmos TreeTrunk, SunRise and SunsetBeach. Note that the Market3 sequence was played at a slower frame rate than the original content (50 fps). The data was stored as uncompressed 16-bit TIFF files with 12-bit non-linearly quantized RGB signal representation (using Dolby PQ EOTF). The data range was the Serial Digital Interface (SDI) data range, in which the code values vary from 16 to 4076, and the colour space was BT.2020 RGB. The experimental settings followed the HM LDB and random access (RA) configurations, and hierarchical bit allocation was enabled. In the HDR10 pipeline case, 10-bit HDR videos were encoded with four different QP levels. Likewise, in the SDR10 pipeline case, SDR videos were encoded with the same four QP levels using the TMOs mentioned above. The target bit rates were set to be the actual bit rates obtained by compressing the same sequences at fixed QP values with non-RC HEVC encoding. The QPs used for some of the videos may be] [18, 26, 34, 38] and [29, 33, 37, 41], respectively. All algorithms are tested on the same platform to guarantee fair comparisons. More detailed information can be found in a table of FIG. 11 listing an experimental configuration for different video sequences.

First, experimental results for R-D performance are discussed, and the rate-HDR-VDP-2 performance of each of the different methods is compared. HDR-VDP-2 usually takes values between 0 and 100. The R-D performance is evaluated in terms of Bjøntegaard delta bit rate (BD-BR). The experimental results are shown in a table of FIG. 12 which shows performance of the video coding method of the present invention compared with other RC schemes in terms of HDR-VDP-2 (LDB). The experiment shows that the method of Bai et al. [1] achieves good performance through further modification of the R-λ model, while the method of Perez et al. [2] achieves further improved performance by dividing the model into several different regions. These two methods can both achieve better performance than the HEVC reference software HM16.19. Because the video coding method of the present invention is based on HDR-VDP-2, it can achieve significantly improved rate-HDR-VDP-2 performance based on the afore-described R-D model and global optimization method for HDR video coding.

VQM is a standardized metric for objectively measuring video quality. Validation tests by the international Video Quality Experts Group (VQEG) have shown a very high correlation between subjective user surveys and the objectively measured results obtained using the VQM approach. The results achieved with the different algorithms based on VQM are compared in a table of FIG. 13 which shows performance of the video coding method of the present invention compared with other RC schemes in terms of HDR-VQM (LDB). As revealed by the experimental results, the video coding method of the present invention can achieve good results not only in terms of HDR-VDP-2 but also in terms of VQM.

Moreover, the mPSNR metric is considered, which is a version of the peak-signal-to-noise ratio (PSNR) for HDR content that considers the exposure levels. The experimental results in terms of the mPSNR are shown in a table of FIG. 14 which shows performance of the video coding method of the present invention compared with other RC schemes in terms of the mPSNR (LDB). According to the table, the video coding method of the present invention outperforms the others not only in terms of BD-HDR-VDP-2 and BD-VQM performance but also in terms of BD-mPSNR performance. Additionally, the relative time complexity of the video coding method of the present invention can be evaluated as equation (22).

$$\Delta T = \frac{T_{pro} - T_{org}}{T_{org}} \times 100\%, \qquad (22)$$

where $T_{pro}$ and $T_{org}$ denote the encoding time of the related method and the encoding time of the HEVC reference software HM16.19, respectively, and a greater than 2% complexity is imposed on the encoder. The time complexity of, the video coding method of the present invention presents a negligible increase.

Experimental results obtained under the RA configuration are also shown in tables of FIGS. 15-17, respectively, in which FIG. 15 shows performance of the video coding method of the present invention compared with other RC schemes in terms of HDR-VDP-2 (RA); FIG. 16 shows performance of the video coding method of the present invention compared with other RC schemes in terms of HDR-VQM (RA); and FIG. 17 shows performance of the video coding method of the present invention compared with other RC schemes in terms of the mPSNR (RA). These experimental results illustrate that the video coding method of the present invention can achieve good results not only under the LDB configuration but also under the RA configuration.

Figure 18:
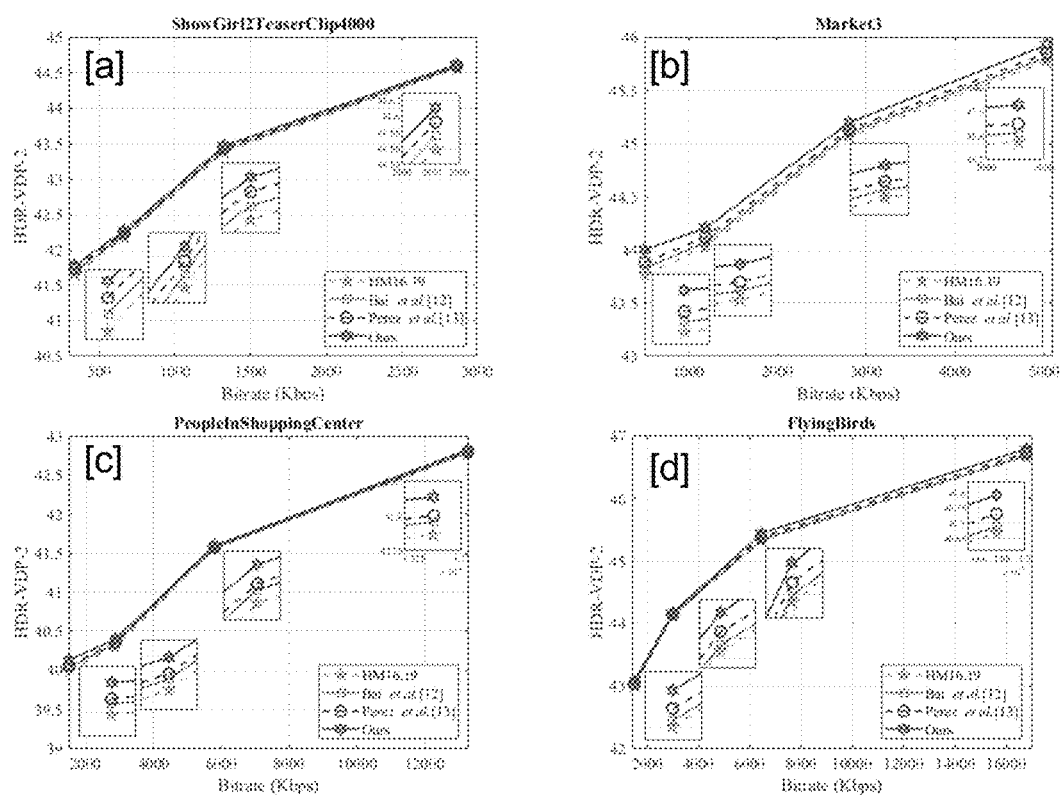
FIG. 18 shows R-D curves for the four compared coding methods.

Referring to FIG. 18 which shows R-D curves for the four compared coding methods, the algorithm for executing the video coding method of the present invention achieves better R-D performance than the other three algorithms do.

Second, experimental results for bit rate accuracy are discussed, and the algorithm for executing the video coding method of the present invention is compared with the other RC algorithms with regard to the sequence-level and frame-level RC accuracy. Achieving an accurate bit rate that is close to the target bit rate is one objective of RC optimization. Tables of FIGS. 19-22 show comparison for the frame-level and sequence-level RC errors of the different methods, in which FIG. 19 shows frame-level RC accuracy comparisons (%) (LDB); FIG. 20 shows sequence-level RC accuracy comparisons (%) (LDB); FIG. 21 shows frame-level RC accuracy comparisons (%) (RA); and FIG. 22 shows sequence-level RC accuracy comparisons (%) (RA).

Figure 23:
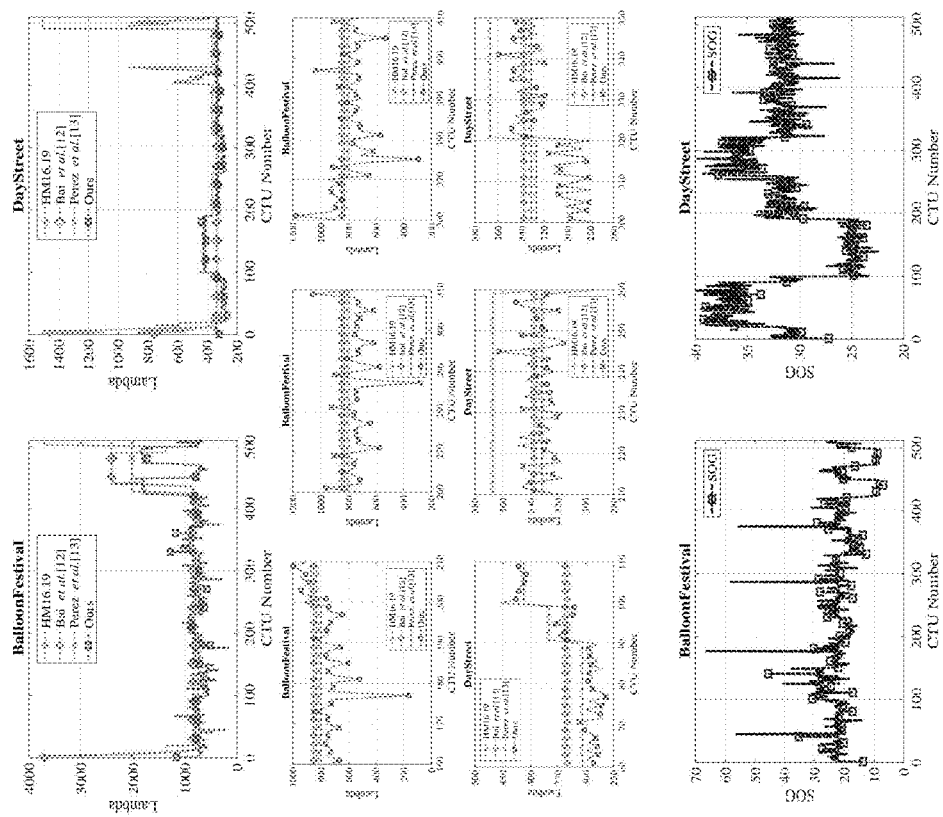
FIG. 23 shows comparisons of λ values of individual CTUs obtained with the different algorithms.

The results show that among these algorithms, the 0.1-based video coding method of the present invention achieves better RC results at both the sequence level and the frame level by means of global optimization. Moreover, as shown in FIG. 23 which shows comparisons of λ values of individual CTUs obtained with the different algorithms. It can be seen from FIG. 23 that in this respect, the method of Bai et al. [1] is most similar to HM16.19. In the same figure, the complexity of each CTU (sum-of-gradient (SOG)) is plotted. From FIG. 23, the λ values obtained with the video coding method of the present invention well reflect the complexity distribution.

Moreover, the bit rate fluctuations between frames for the different algorithms are compared in FIG. 23. From the experimental results, it can again be observed that the method of Bai et al. [1] is similar to HM16.19. This is because in the method of Bai et al. [1], HDR video processing is performed based on the R-A model. The bit rate fluctuations of the method of Perez et al. [2] are also close to those of the method of Bai et al. [1] and HM16.19, whereas the video coding method of the present invention is superior to the other methods in this respect. The results show that the video coding method of the present invention achieves better results using global optimization based on λ.

Third, experimental results for subjective comparison are discussed, and the algorithm for executing the video coding method of the present invention is compared with the other RC algorithms with regard to the sequence-level and frame-level RC accuracy.

Figure 24:
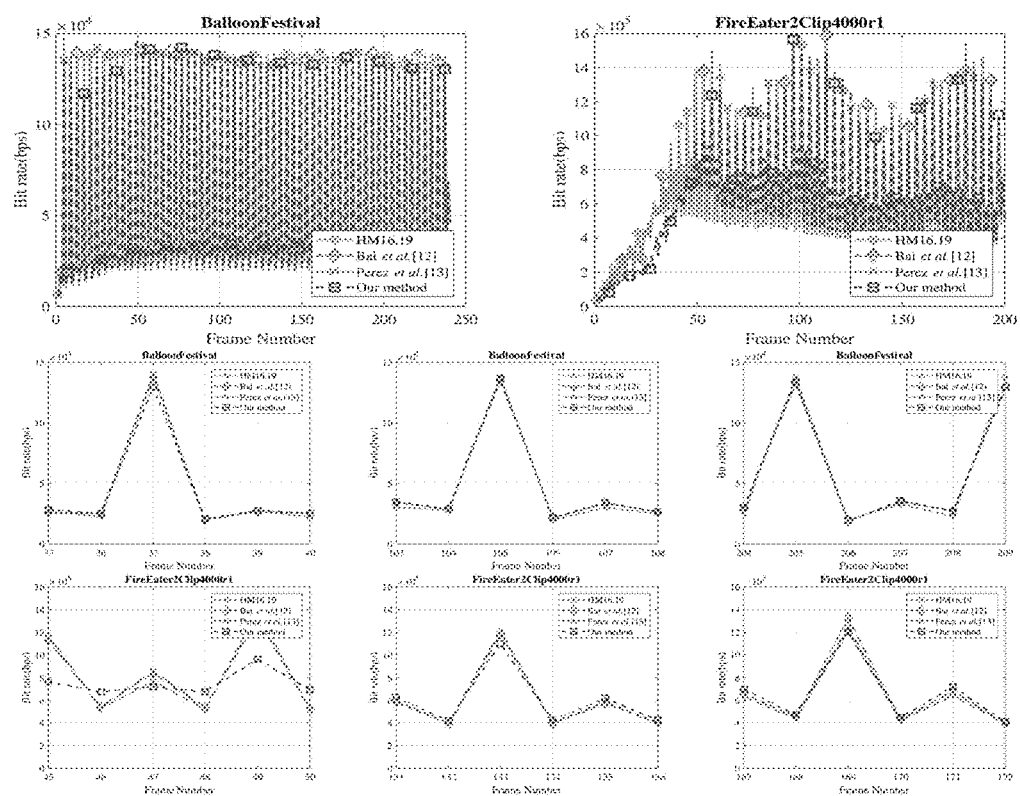
FIG. 24 shows comparisons of bit cost at the frame level.
Figure 25:
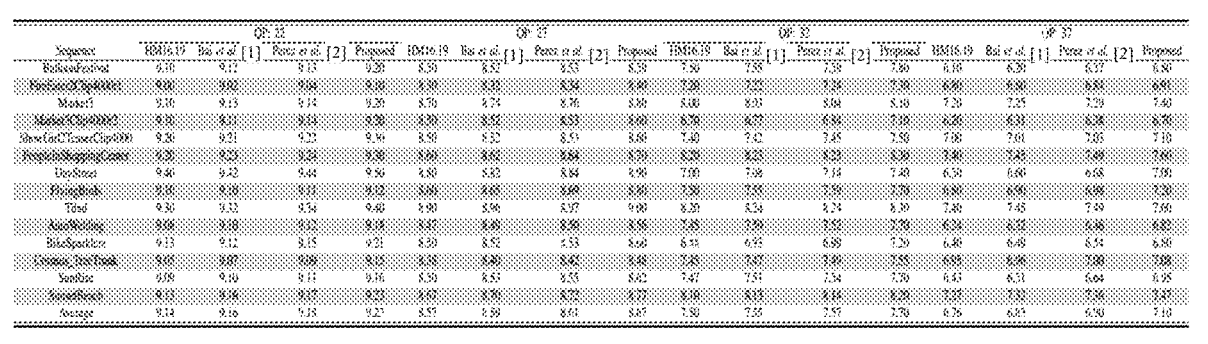

In this regard, a total of 15 adult subjects (ten male and five female) participate in a subjective experiment. The subjects ranged in age from 24 to 34 years old, with an average age of 27. All participants had normal colour perception. They had little knowledge of this field and were not aware of the test objectives. An 11-point numerical impairment score scale ranging from zero to ten was utilized. The following guidance was given to the subjects with regard to scoring: Give a score of 10 if no difference between the source and the video clip was observed. Give a score of 9 in a case where only minimal impairment is visible or a score of 8 if such differences are noted in many areas of the screen. Give a score of 7 or 6 if impairments are clearly visible. Give a score of 5 or 4 if impairments are evident at first sight. Give a score of 3 or 2 if the impairments are highly annoying. Give a score or 1 or 0 if the image is severely corrupted in certain areas or everywhere. The results are shown in FIG. 24 showing comparisons of bit cost at the frame level, in which target bitrate for Balloon-Festival is 1288 kbps; and target bitrate for FireEater2Clip4000r1 is 15651 kbps. Furthermore, according to a table of FIG. 25, which shows category results from the subjective assessment (Mean Opinion Score (MOS)), the experimental results show that the video coding method of the present invention is superior to the other methods.

Fourth, buffer occupancy evaluation is discussed. Buffer occupancy is an important concern in RC, as overflow and underflow should both be avoided. Therefore, stable buffer occupancy is of great importance in evaluating RC performance. The buffer size is defined as equation (23).

$$B_{uf} = D_{elay} \times T_{ar}, \qquad (23)$$

where $D_{elay}$ is the delay time and $T_{ar}$ is the bandwidth. The buffer occupancy is determined mainly based on the target bits and actual bits. FIG. 26 shows buffer occupancy results for four typical sequences. As shown in FIG. 26, the other RC methods have higher buffer occupancy than the video coding method of the present invention. Generally speaking, the scheme of the video coding method of the present invention can maintain lower buffer occupancy, thereby preventing stalling phenomena and achieving a better quality of experience. The reason why the video coding method of the present invention is superior to the other methods is that it can allocate the appropriate bit rate for each CTU from the global perspective.

As described above, in the present disclosure, an RC scheme for HDR in HEVC is provided. Briefly, considering the characteristics of HDR image content, a R-D model based on HDR-VDP-2 for performance optimization is provided. In the optimization process, the λ is directly utilized rather than the bit rate to obtain the globally optimal solution. Finally, the model parameter estimation method is used to reduce errors. Experimental results show that a 2.7% bit rate reduction on average in terms of HDR-VDP-2 and a 3.8% bit rate reduction on average in terms of VQM can be achieved compared with the state-of-the-art algorithm used in HM16.19.

The electronic embodiments disclosed herein, particularly the described processing servers, may be implemented using computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the electronic embodiments may be executed in one or more computing devices including server computers, personal computers, laptop computers, mobile computing devices such as smartphones and tablet computers.

The electronic embodiments include computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Various embodiments of the present invention also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A method for video coding with global rate-distortion optimization-based rate control (RC), comprising:
generating multiple frames of an input video using a video coding system;
dividing one of the frames of the input video into multiple coding tree units (CTUs) using the video coding system;
determining one or more CTU level coding bits through rate-distortion (R-D) performance optimization using the video coding system, comprising determining a Lagrange multiplier to compute rate and distortion for the i-th CTU of the j-th frame of the frames, wherein either i or j is a positive integer, and the Lagrange multiplier is determined by:

$$\lambda_i = \left(\frac{e^\phi}{c_i}\right)^{\frac{c_i+1}{c_i}} \frac{c_i}{k_i^{\frac{1}{c_i}}},$$

where $\lambda_i$ is the Lagrange multiplier for the i-th CTU, $c_i$ and $k_i$ are first and second model parameters for the i-th CTU, respectively, and $\phi$ is expressed by:

$$\phi = \frac{\sum_{i=1}^{N}\left(\frac{\ln(k_i c_i)}{c_i}\right) - N\ln\frac{R_c}{N}}{\sum_{i=1}^{N}\left(\frac{1}{c_i}\right)},$$

where $R_c$ is rate constraint and N is the number of the CTUs, and the computer rate and the distortion are computed by:

$$R_i = \left(\frac{\lambda_i}{c_i k_i}\right)^{-\frac{1}{c_i+1}},$$

$$D_i = \left(\frac{\lambda_i k_i^{\frac{1}{c_i}}}{c_i}\right)^{\frac{c_i}{c_i+1}},$$

where $R_i$ and $D_i$ are the rate and the distortion for the i-th CTU, respectively;
encoding the i-th CTU to generate a bit stream; and
outputting the bit stream.

2. The method of claim 1, further comprising:
decoding the bit stream to generate a video stream; and
displaying video content based on the video stream by a displayer.

3. The method of claim 1, further comprising:
updating the first and second model parameters of the i-th CTU to obtain the next model parameters for the i-th CTU of the (j+1)-th frame of the frames by:

$$c_{new} = c_{old} + \sigma_\beta (\ln D_{real} - \ln D_{comp}) \cdot \ln R_{real},$$

$$k_{new} = k_{old} + \sigma_\alpha (\ln D_{real} - \ln D_{comp}) \cdot k_{old},$$

where $c_{old}$ and $k_{old}$ are the first and second model parameters for the i-th CTU of the j-th frame, $c_{new}$ and $k_{new}$ are the first and second model parameters for the i-th CTU of the (j+1)-th frame, coefficients $\sigma_\alpha$ and $\sigma_\beta$ are constants, $R_{real}$ is an actual bitrate of the i-th CTU that serves as the co-located CTU to the i-th CTU of the (j+1)-th frame, $D_{real}$ is a true distortion, $D_{comp}$ is obtained from the the i-th CTU of the j-th frame.

4. The method of claim 1, further comprising:
computing a first reference value $c_{region}$ which is an average of the first model parameters for all of the CTUs in one of the frames; and
comparing the first model parameter of the i-th CTU with the first reference value, wherein if the first model parameter is larger than the first reference value, the first model parameter is clipped by:

$$\max(c_i, c_{region} * \exp(-2.0)),$$

wherein if the first model parameter is less than or equal to the first reference value, the first model parameter is clipped by:

$$\min(c_i, c_{region} * \exp(1)).$$

5. The method of claim 4, further comprising:
computing a second reference value $k_{region}$ which is an average of the second model parameters for all of the CTUs in one of the frames; and
comparing the second model parameter of the i-th CTU with the second reference value, wherein if the second model parameter is larger than the second reference value, the second model parameter is clipped by:

$$\max(k_i, k_{region} * \exp(-2.0)),$$

wherein if the second model parameter is less than or equal to the second reference value, the second model parameter is clipped by:

min($k_i, k_{region}$*exp(1)).

6. The method of claim 5, further comprising:
computing the Lagrange multiplier by using the clipped first and second model parameters; and
computing a $QP_i$ value for the i-th CTU in CTU level by:

$QP_i = \lfloor a \times \ln(\lambda_i) + b + 0.5 \rfloor$, where coefficients a and b are constants, and wherein the encoding the i-th CTU is executed by introducing the $QP_i$ value.

7. The method of claim 6, wherein the clipped first and second model parameters of the i-th CTU are updated after computing the Lagrange multiplier, and the method further comprises:
clipping the first and second model parameters for the i-th CTU of the (j+1)-th frame by the updated first and second model parameters of the i-th CTU that serves as the co-located CTU to the i-th CTU of the (j+1)-th frame.

8. The method of claim 1, comprising:
dividing a target luma range into continuous a first interval and a second interval which are independent of each other; and
determining a region type to which one of the CTUs of the frame belongs according to a luma value of the CTU, wherein the region type of the CTU is determined as an SDR region when the luma value thereof is in the first interval, the region type of the CTU is determined as an HDR region when the luma value thereof is in the second interval, and the region type of the CTU is determined as a Mixed region when the luma value thereof spans the first and second intervals.

9. The method of claim 8, further comprising:
allocating an initial first model parameter and an initial second model parameter according to the region type of the CTU, wherein values of a first set of the initial first and second model parameters for the SDR region, values of a second set of the initial first and second model parameters for the HDR region, and values of a third set of the initial first and second model parameters for the Mixed region are different.

10. The method of claim 9, wherein the values of the initial first and second model parameters for the SDR region are 34.22 and −0.031 respectively, the values of the initial first and second model parameters for the HDR region are 34.64 and −0.036 respectively, and the values of the initial first and second model parameters for the Mixed region are 34.40 and −0.034 respectively.

11. A video coding system for video coding with global rate-distortion optimization-based rate control (RC), comprising:
an encoder configured to generate multiple frames of an input video and to divide one of the frames of the input video into multiple coding tree units (CTUs), wherein the encoder is further configured to determine one or more CTU level coding bits through rate-distortion (R-D) performance optimization which comprises determining a Lagrange multiplier to compute rate and distortion for the i-th CTU of the j-th frame of the frames, wherein either i or j is a positive integer, and the Lagrange multiplier is determined by:

$$\lambda_i = \left(\frac{e^\phi}{c_i}\right)^{\frac{c_i+1}{c_i}} \frac{c_i}{k_i^{\frac{1}{c_i}}},$$

where $\lambda_i$ is the Lagrange multiplier for the i-th CTU, $c_i$ and $k_i$ are first and second model parameters for the i-th CTU, respectively, and $\phi$ is expressed by:

$$\phi = \frac{\sum_{i=1}^{N}\left(\frac{\ln(k_i c_i)}{c_i}\right) - N\ln\frac{R_c}{N}}{\sum_{i=1}^{N}\left(\frac{1}{c_i}\right)},$$

where $R_c$ is rate constraint and N is the number of the CTUs, and the computer rate and the distortion are computed by:

$$R_i = \left(\frac{\lambda_i}{c_i k_i}\right)^{-\frac{1}{c_i+1}},$$

$$D_i = \left(\frac{\lambda_i k^{\frac{1}{c_i}}}{c_i}\right)^{\frac{c_i}{c_i+1}},$$

where $R_i$ and $D_i$ are the rate and the distortion for the i-th CTU, respectively, wherein the encoder is further configured to encode the i-th CTU to generate a bit stream.

12. The video coding system of claim 11, further comprising:
a decoder configured to decode the bit stream to generate a video stream; and
a displayer configured to display video content based on the video stream.

13. The video coding system of claim 11, wherein the encoder is further configured to update the first and second model parameters of the i-th CTU to obtain the next model parameters for the i-th CTU of the (j+1)-th frame of the frames by:

$c_{new} = c_{old} + \sigma_\beta (\ln D_{real} - \ln D_{comp}) \cdot \ln R_{real}$, $k_{new} = k_{old} + \sigma_\alpha (\ln D_{real} - \ln D_{comp}) \cdot k_{old}$, where $c_{old}$ and $k_{old}$ are the first and second model parameters for the i-th CTU of the j-th frame, $c_{new}$ and $k_{new}$ are the first and second model parameters for the i-th CTU of the (j+1)-th frame, coefficients $\sigma_\alpha$ and $\sigma_\beta$ are constants, $R_{real}$ is an actual bitrate of the i-th CTU that serves as the co-located CTU to the i-th CTU of the (j+1)-th frame, $D_{real}$ is a true distortion, $D_{comp}$ is obtained from the the i-th CTU of the j-th frame.

14. The video coding system of claim 11, wherein the encoder is further configured to compute a first reference value $c_{region}$ which is an average of the first model parameters for all of the CTUs in one of the frames, and the encoder is further configured to compare the first model parameter of the i-th CTU with the first reference value, wherein if the first model parameter is larger than the first reference value, the first model parameter is clipped by:

max($c_i, c_{region}$*exp(−2.0)), wherein if the first model parameter is less than or equal to the first reference value, the first model parameter is clipped by:

min($c_i, c_{region}$*exp(1)).

15. The video coding system of claim 14, wherein the encoder is further configured to compute a second reference value $k_{region}$ which is an average of the second model parameters for all of the CTUs in one of the frames, and the encoder is further configured to compare the second model parameter of the i-th CTU with the second reference value, wherein if the second model parameter is larger than the second reference value, the second model parameter is clipped by:

$$\max(k_i, k_{region}*\exp(-2.0)),$$

wherein if the second model parameter is less than or equal to the second reference value, the second model parameter is clipped by:

$$\min(k_i, k_{region}*\exp(1)).$$

16. The video coding system of claim 15, wherein the encoder is further configured to compute the Lagrange multiplier by using the clipped first and second model parameters, and the encoder is further configured to compute a $QP_i$ value for the i-th CTU in CTU level by:

$$QP_i = \lfloor a \times \ln(\lambda_i) + b + 0.5 \rfloor,$$

where coefficients a and b are constants, and wherein the encoding the i-th CTU is executed by introducing the $QP_i$ value.

17. The video coding system of claim 16, wherein the clipped first and second model parameters of the i-th CTU are updated after the Lagrange multiplier is computed, and the encoder is further configured to clip the first and second model parameters for the i-th CTU of the (j+1)-th frame by the updated first and second model parameters of the i-th CTU that serves as the co-located CTU to the i-th CTU of the (j+1)-th frame.

18. The video coding system of claim 11, wherein the encoder is further configured to divide a target luma range into continuous a first interval and a second interval which are independent of each other, and the encoder is further configured to determine a region type to which one of the CTUs of the frame belongs according to a luma value of the input video, wherein the region type of the CTU is determined as an SDR region when the luma value thereof is in the first interval, the region type of the CTU is determined as an HDR region when the luma value thereof is in the second interval, and the region type of the CTU is determined as a Mixed region when the luma value thereof spans the first and second intervals.

19. The video coding system of claim 18, wherein the encoder is further configured to allocate an initial first model parameter and an initial second model parameter according to the region type of the CTU, wherein values of a first set of the initial first and second model parameters for the SDR region, values of a second set of the initial first and second model parameters for the HDR region, and values of a third set of the initial first and second model parameters for the Mixed region are different.

20. The video coding system of claim 19, wherein the values of the initial first and second model parameters for the SDR region are 34.22 and −0.031 respectively, the values of the initial first and second model parameters for the HDR region are 34.64 and −0.036 respectively, and the values of the initial first and second model parameters for the Mixed region are 34.40 and −0.034 respectively.

* * * * *